(12) United States Patent
Yao et al.

(10) Patent No.: US 12,402,165 B2
(45) Date of Patent: Aug. 26, 2025

(54) METHODS AND APPARATUS FOR SIDELINK RESOURCE EXCLUSION FOR INTRA-DEVICE COORDINATION IN WIRELESS COMMUNICATION

(71) Applicant: Apple Inc., Cupertino, CA (US)

(72) Inventors: Chunhai Yao, Beijing (CN); Chunxuan Ye, Beijing (CN); Dawei Zhang, Cupertino, CA (US); Haitong Sun, Cupertino, CA (US); Hong He, Cupertino, CA (US); Jie Cui, Cupertino, CA (US); Oghenekome Oteri, Cupertino, CA (US); Wei Zeng, Cupertino, CA (US); Weidong Yang, Cupertino, CA (US); Yang Tang, Cupertino, CA (US); Yuchul Kim, Cupertino, CA (US); Yushu Zhang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/598,236

(22) PCT Filed: Aug. 6, 2020

(86) PCT No.: PCT/CN2020/107406
§ 371 (c)(1),
(2) Date: Oct. 14, 2021

(87) PCT Pub. No.: WO2022/027436
PCT Pub. Date: Feb. 10, 2022

(65) Prior Publication Data
US 2023/0156785 A1    May 18, 2023

(51) Int. Cl.
*H04W 74/08* (2024.01)
*H04L 1/1829* (2023.01)
*H04W 74/0808* (2024.01)

(52) U.S. Cl.
CPC ....... *H04W 74/0808* (2013.01); *H04L 1/1854* (2013.01)

(58) Field of Classification Search
CPC ..... H04W 74/08; H04W 24/10; H04W 92/18; H04W 72/02; H04W 72/14; H04W 72/30;
(Continued)

(56) References Cited

U.S. PATENT DOCUMENTS

| 10,440,687 | B2 | 10/2019 | Wei et al. |
| 10,667,239 | B2 | 5/2020 | Sartori et al. |

(Continued)

FOREIGN PATENT DOCUMENTS

| CN | 110943809 A | 3/2020 |
| CN | 110944394 A | 3/2020 |

(Continued)

OTHER PUBLICATIONS

Non-Final Office Action received for U.S. Appl. No. 18/376,382, mailed on Sep. 27, 2024, 14 pages.
(Continued)

*Primary Examiner* — Man U Phan
(74) *Attorney, Agent, or Firm* — Kubota & Basol LLP

(57) ABSTRACT

A method that determines a resource at a first user equipment (UE) for a sidelink communication from the second UE to a first UE is described. In an exemplary embodiment, the method receives a request from the second UE to send data to the first UE. In addition, the method determines a preconfigured resource selection window that is used by the second UE. Furthermore, the method determines a first sensing result at the first UE. The determined first sensing result includes information to be reported to the second UE for a resource selection. The determined first sensing results
(Continued)

has a plurality of first sensing types. Further, the method transmits the first sensing result from the first UE to the second UE.

20 Claims, 23 Drawing Sheets

(58) Field of Classification Search
CPC ..... H04W 72/53; H04W 84/04; H04W 72/00; H04W 72/12; H04W 72/04; H04W 74/04; H04L 1/18; H04L 5/00; H04L 1/08; H04B 17/31
USPC .......................................................... 370/329
See application file for complete search history.

(56) References Cited

U.S. PATENT DOCUMENTS

| | | | |
|---|---|---|---|
| 10,980,036 | B2 | 4/2021 | Lu et al. |
| 11,082,953 | B2* | 8/2021 | Wang ................... H04W 72/541 |
| 11,115,835 | B2* | 9/2021 | Byun .................... H04W 76/27 |
| 11,259,274 | B2 | 2/2022 | Hoang et al. |
| 11,265,764 | B2* | 3/2022 | Tang ..................... H04W 80/02 |
| 11,357,045 | B2* | 6/2022 | Chae ................... H04W 74/002 |
| 11,382,107 | B2* | 7/2022 | Jung ....................... H04W 4/02 |
| 11,432,369 | B2 | 8/2022 | Xiong et al. |
| 11,606,810 | B2* | 3/2023 | Nam ...................... H04W 76/11 |
| 11,672,035 | B2* | 6/2023 | Jung ........................ H04W 4/40 |
| | | | 370/235 |
| 11,723,046 | B2* | 8/2023 | Li ..................... H04W 74/0808 |
| | | | 370/329 |
| 11,825,517 | B2* | 11/2023 | Wang .................... H04W 72/02 |
| 2020/0100215 | A1 | 3/2020 | Li et al. |
| 2020/0229143 | A1* | 7/2020 | Wei ..................... H04L 41/0893 |
| 2021/0058899 | A1* | 2/2021 | Lee ..................... H04W 52/146 |
| 2022/0330261 | A1* | 10/2022 | Yeo ..................... H04W 72/543 |
| 2023/0091084 | A1 | 3/2023 | Miao et al. |
| 2023/0131353 | A1 | 4/2023 | Miao et al. |
| 2023/0199728 | A1 | 6/2023 | Yoshioka et al. |
| 2023/0209593 | A1 | 6/2023 | Miao et al. |
| 2023/0337260 | A1* | 10/2023 | Li ......................... H04L 1/1854 |
| 2024/0032096 | A1 | 1/2024 | Yao et al. |

FOREIGN PATENT DOCUMENTS

| | | |
|---|---|---|
| CN | 110972316 A | 4/2020 |
| EP | 3681106 A1 | 7/2020 |
| WO | 2020/011336 A1 | 1/2020 |
| WO | 2020/145803 A1 | 7/2020 |

OTHER PUBLICATIONS

CMCC: "Discussion on sidelink resource allocation mechanism", 3GPP Draft; R1-1906515, 3rd Generation Partnership Project (3GPP), Mobile Competence Centre; vol. RAN WG1, No. Reno, USA; May 13, 2019-May 17, 2019, XP051727965.

European Search Report and Search Opinion received for European Application No. 23200028.1, mailed on Dec. 7, 2023, 10 pages.

International Preliminary Report on Patentability received for PCT Patent Application No. PCT/CN2020/107406, mailed on Feb. 16, 2023, 5 pages.

International Search Report and Written Opinion received for PCT Patent Application No. PCT/CN2020/107406, mailed on Apr. 29, 2021, 6 pages.

Vivo, "Discussion on mode 2 resource allocation mechanism", 3GPP TSG RAN WG1 #96bis R1-1904074, Apr. 8-12, 2019, 11 pages.

Vivo, "Discussion on resource allocation mechanism for NR V2X", 3GPP TSG RAN WG1 #96 R1-1903337, Feb. 25-Mar. 1, 2019, 13 pages.

Final Office Action received for U.S. Appl. No. 18/376,382, mailed on Jan. 8, 2025, 14 pages.

Office Action received for Chinese Patent Application No. 202080103675.2, mailed on Jul. 12, 2024, 28 pages (17 pages of English Translation and 11 pages of Original Document).

Supplementary European Search Report and Search Opinion received for European Application No. 20948233.0, mailed on Mar. 20, 2024, 9 pages.

* cited by examiner

Solution 1-5: Excluded resource reporting

- Step 2: UE A sends its local sensing results to UE B
  - Information to be sent

1100

| | Resource for UE A's Tx | Data priority of UE A's Tx | |
|---|---|---|---|
| Type 1 | Resource for a third UE's Tx | Data priority of a third UE's Tx | Measured RSRP |
| Type 2 | Resource for UE A's Rx | Data priority of UE A's Rx | Number of simultaneous PSFCH transmissions |
| Type 3 | Resource for UE A's Tx | Data priority of UE A's Tx | |
| Type 4 | Time windows of the resource selection (T1', T2') | | |

- Transmissions are in PSSCH
  - MAC Control Element (MAC CE) or (Radio Resource Control)RRC message

FIG. 11

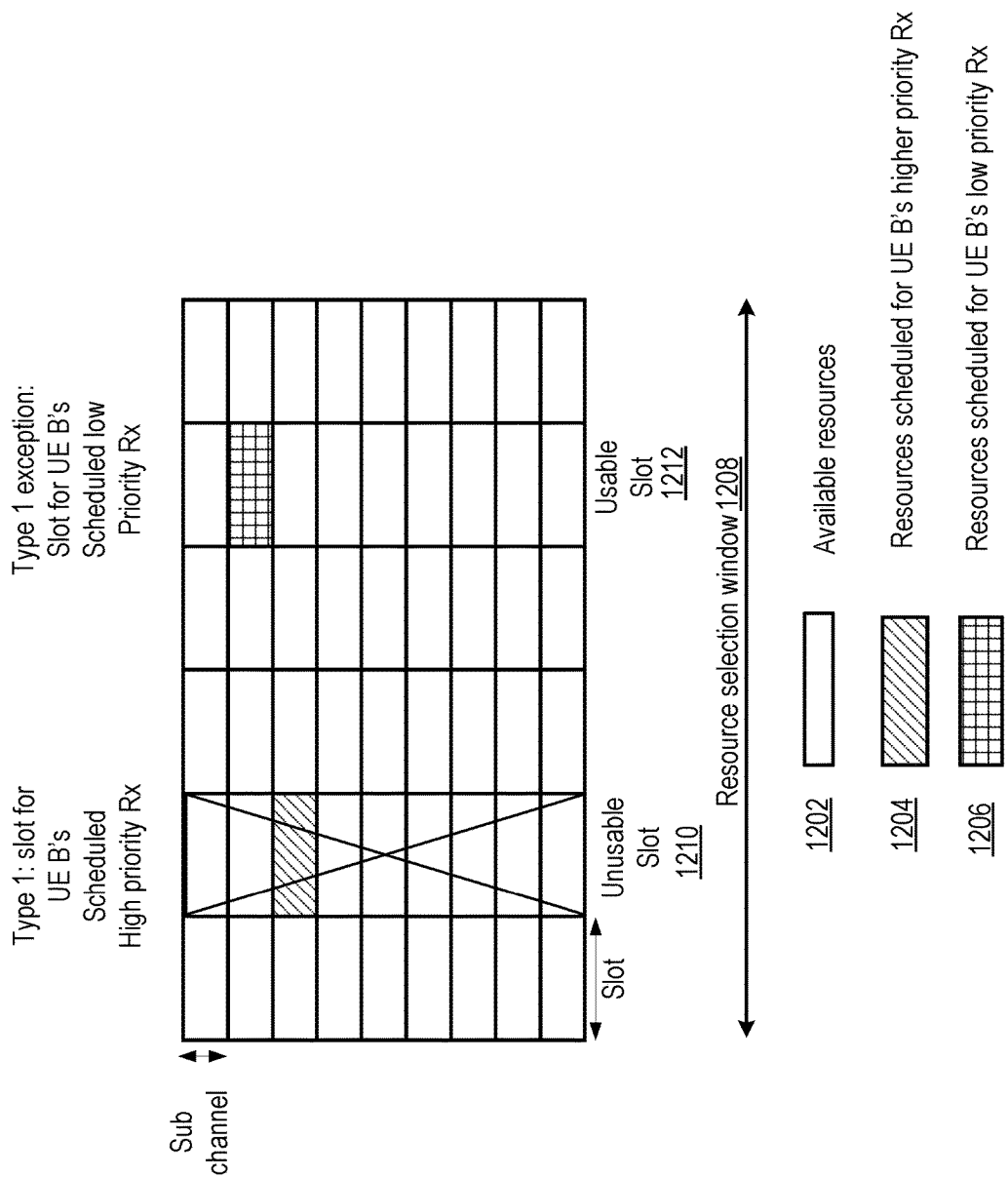

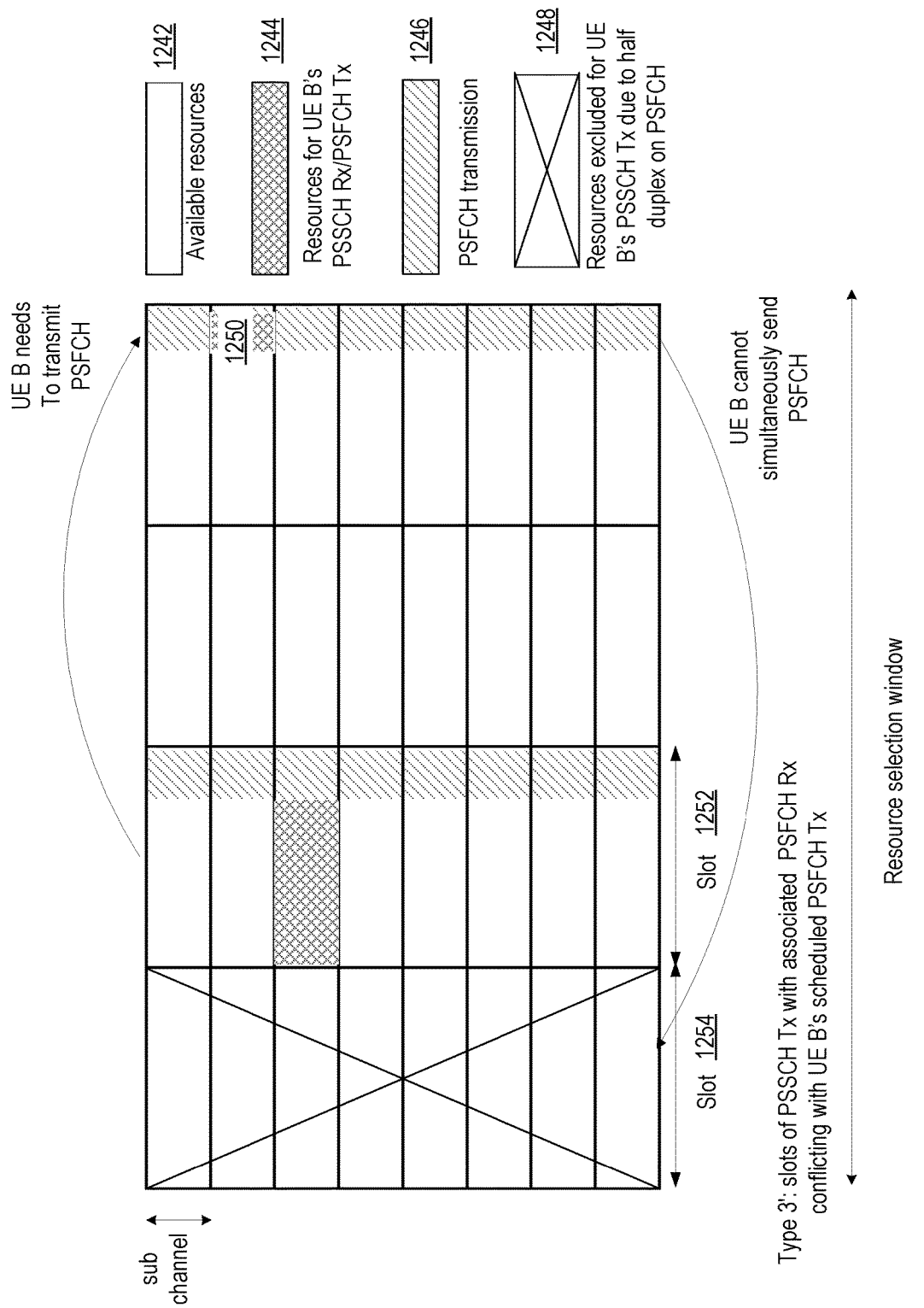

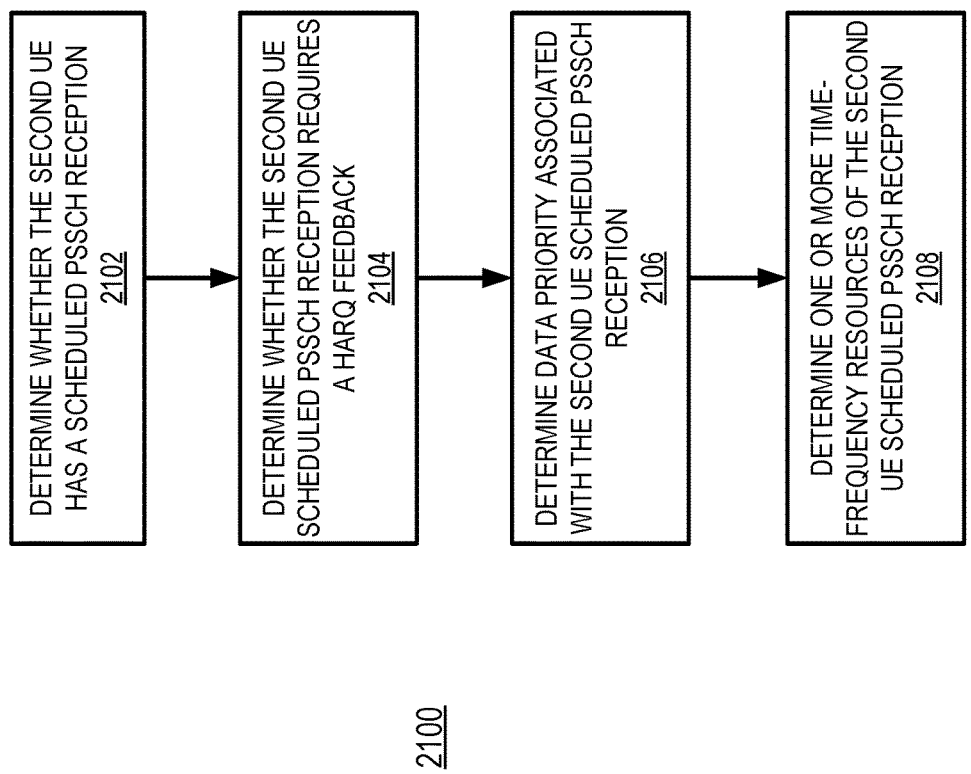

METHODS AND APPARATUS FOR SIDELINK RESOURCE EXCLUSION FOR INTRA-DEVICE COORDINATION IN WIRELESS COMMUNICATION

RELATED APPLICATIONS

The present application is the national phase of International Application No. PCT/CN2020/107406, filed on Aug. 6, 2020, and the disclosure of which is hereby incorporated herein by reference in its entirety.

FIELD OF INVENTION

This invention relates generally to wireless technology and more particularly to a determining and selecting resources for a sidelink communication.

BACKGROUND OF THE INVENTION

In a wireless communications network, a user equipment (UE) determines a number of available resources (e.g., sidelink resources) to communicate data and selects a subset of these resources for use in communicating the data based on resource allocation schemes. New Radio (NR) (Vehicle-to-everything) V2X R16 support Mode 1 and Mode 2 resource allocation schemes. In an existing Mode 2 resource allocation scheme, the UE selects sidelink resources (e.g., sidelink transmission resources) in a manner to minimize collision probability and to reduce an interference level. Specifically, in Mode 2 resource allocation scheme for NR V2X, a transmitter UE autonomously selects sidelink transmission resources based on its own channel sensing mechanism and a resource selection procedure.

However, the existing Mode 2 resource allocation scheme lacks assistance information provided by the receiver UE to the transmitter UE. Thus, there is a need for an enhanced mechanism for the receiver UE to send the assistance information as additional sensing results to the transmitter UE, thereby helping the transmitter UE to efficiently select sidelink resources for a more reliable sidelink transmission. The enhanced mechanism may enhance the reliability and reduce latency in consideration of both Packet Reception Ratio (PRR) and Packet Inter-Reception (PIR) defined in TR37.885.

SUMMARY OF THE DESCRIPTION

A method that determines a resource at a first user equipment (UE) for a sidelink communication from a second UE to the first UE is described. In an exemplary embodiment, the method receives a request from the second UE to send data to the first UE. In addition, the method determines a preconfigured resource selection window that is used by the second UE. Furthermore, the method determines a first sensing result at the first UE. The determined first sensing result includes information to be reported to the second UE for a resource selection. The determined first sensing results has a plurality of first sensing types. Further, the method transmits the first sensing result from the first UE to the second UE.

In some other embodiments, the method determines the first sensing result by determining whether the first UE has a scheduled transmission. In addition, the method determines the first sensing result by determining data priority associated with the first UE scheduled transmission. The data priority is used by the second UE for the resource selection. The method determines the first sensing result by designating the resource to the second UE if the data to be sent from the second UE to the first UE have higher data priority than the data to be transmitted by the first UE. Furthermore, the method determines the first sensing result by determining one or both of time and frequency resources associated with the first UE scheduled transmission. The first sensing result defines a first type of the plurality of first sensing types and the first type of the plurality of first sensing types is based on (Physical Sidelink Shared Channel) PSSCH half-duplex transmission.

In some other embodiments, the method determines the first sensing result by determining whether one or more of time and frequency resources has been reserved by a third UE. In addition, the method determines the first sensing result by determining data priority associated with data to be sent by the third UE. Additionally, the method determines the first sensing result by measuring a Reference Signal Receive Power (RSRP) level associated with the third UE. Furthermore, the method determines the first sensing result by designating the resource to the second UE if one or both of the data to be sent by the third UE have low priority and the measured RSRP level associated with the third UE is low. The first sensing result defines a second type of the plurality of first sensing types and the second type of the plurality of first sensing types is based on a reservation information from the third UE. Further, the method determines the first sensing result by adjusting a transmission power associated with the second UE based on the measured RSRP level to overcome an interference generated by the third UE.

In some other embodiments, the method determines the first sensing result by determining a limit of a number of simultaneous Physical Sidelink Feedback Channel (PSFCH) transmissions, with a PSFCH associated with a Physical Sidelink Shared Channel (PSSCH) transmission in a slot N. The PSFCH is transmitted in a slot N+K, wherein K is predetermined according to a resource pool, and N and K are integers. In addition, the method determines the first sensing result by designating the resource to the second UE if a PSSCH reception by the first UE is in a slot which does not require a PSFCH transmission. Moreover, the method determines the first sensing result by determining data priority associated with the PSSCH reception. Additionally, the method determines the first sensing result by designating the resource to the second UE if the PSSCH reception has low priority data. The designating of the resource includes receiving an additional PSSCH reception with high priority data in the slot N or around the slot N whose associated PSFCH transmission is in the slot N+K. Furthermore, the method determines the first sensing result by determining one or more time and frequency resources of the first UE PSSCH reception. The first sensing result defines a third type of the plurality of first sensing types and the third type of the plurality of first sensing types is based on limited capability of the PSFCH transmission for a Hybrid automatic repeat request (HARQ) feedback enabled transmission.

In some other embodiments, the method determines the first sensing result by determining whether the first UE has a scheduled PSSCH transmission. The first UE scheduled PSSCH transmission has an associated slot for a PSFCH reception. In addition, the method determines the first sensing result by determining whether the first UE scheduled PSSCH transmission requires a HARQ feedback. Additionally, the method determines the first sensing result by determining data priority associated with the first UE scheduled PSSCH transmission. The determining of the data priority includes comparing data to be sent from the second UE to the first UE and data to be transmitted by the first UE. Furthermore, the method determines the first sensing result by determining one or more time-frequency resources of the first UE scheduled PSSCH transmission. The first sensing result defines a fourth type of the plurality of first sensing types and the fourth type of the plurality of first sensing types is based on a PSFCH half-duplex transmission.

In some other embodiments, the method iteratively identifies a set of resources of the resource at the first UE until a percentage of the identified set of resources is higher than a predefined threshold. The predefined threshold is preconfigured or configured based on a resource pool or reconfigured by a PC5-Radio Resource Control (RRC) message.

In some other embodiments, the method determines the first sensing result by repeating a determination of a resource associated with one of the plurality of first sensing types with an increased threshold associated with a RSRP level such that the predefined threshold is achieved. In some embodiments, the one of the plurality of first sensing types can be a second type.

In some other embodiments, the determining of the first sensing result can be adapted to a sidelink group-cast with a Hybrid automatic repeat request (HARQ) feedback Option 2. The first sensing result can be transmitted on a PSSCH. The transmitting of the first sensing result can be performed by a single or a subset of UEs. The transmitting the first sensing result can be periodic or event-triggered.

In a further embodiment, a method that selects a resource at a second user equipment (UE) for a sidelink communication from the second UE to a first UE is described. The method receives a first sensing result from a first UE. The first sensing result includes a plurality of first sensing types. Each of the plurality of first sensing types has a first information for a resource selection at the second UE. In addition, the method determines a second sensing result at the second UE. The determined second sensing result includes a second information and the determined second sensing result has a number of second sensing types. Furthermore, the method determines a combined sensing result based on the received first sensing result and the determined second sensing result. Additionally, the method selects the resource to transmit data from the second UE to the first UE based on the determined combined sensing result.

In some other embodiments, the method determines the second sensing result by determining whether the second UE has a scheduled reception (e.g., PSSCH reception). In addition, the method determines the second sensing result by determining data priority associated with the second UE scheduled reception. The data priority is used for the resource selection. The method determines the second sensing result by designating the resource to the second UE if data to be sent from the second UE to the first UE have higher data priority than the data to be received by the second UE. Furthermore, the method determines the second sensing result by determining one or both of time and frequency resources associated with the second UE scheduled reception and the data priority associated with the second UE scheduled reception. The second sensing result defines a first type of the plurality of second sensing types.

In some other embodiments, the method determines the second sensing result by determining whether one or more of time and frequency resources has been reserved by a third UE. In addition, the method determines the second sensing result by determining data priority associated with data to be sent by the third UE. Additionally, the method determines the second sensing result by measuring a Reference Signal Receive Power (RSRP) level associated with the third UE. Furthermore, the method determines the second sensing result by designating the resource to the second UE if one or both of the data to be sent by the third UE have low priority and the measured RSRP level associated with the third UE is low, wherein the second sensing result defines a second type of the plurality of second sensing types.

In some other embodiments, the method determines the second sensing result by determining whether the second UE has a scheduled PSSCH reception. The second UE scheduled PSSCH reception has an associated slot for a PSFCH transmission. In addition, the method determines the second sensing result by determining whether the second UE scheduled PSSCH reception requires a HARQ feedback. Moreover, the method determines the second sensing result by determining data priority associated with the second UE scheduled PSSCH reception. The determining includes comparing data to be received by the second UE and data to be transmitted by the second UE. Furthermore, the method determines the second sensing result by determining one or more time-frequency resources of the second UE scheduled PSSCH reception. The second sensing result defines a third type of the plurality of second sensing types and the third type of the plurality of first sensing types is based on PSFCH half-duplex transmission.

In some other embodiments, the method determines the combined sensing result by combining the same type of the plurality of first and second sensing types. In some other embodiments, each of the plurality of first and second sensing types has a different priority.

In some other embodiments, only a portion of the first information associated with each of the plurality of first sensing types is transmitted to the second UE. In some other embodiments, the first information includes a combination of any of the information associated with any of the plurality of first sensing types.

In another aspect of the disclosure, embodiments of the present disclosure also provide a user equipment (UE) device including a processor configured to perform the processes as described above.

In another further aspect of the disclosure, embodiments of the present disclosure also provide a baseband processor configured to perform the processes as described above.

BRIEF DESCRIPTION OF THE DRAWINGS

The present invention is illustrated by way of example and not limitation in the figures of the accompanying drawings in which like references indicate similar elements.

FIG. 11 is an illustration of some embodiments of information to be transmitted to a second UE (e.g., transmitting UE), according to some embodiments.

FIG. 12A is an illustration of some embodiments of a resource exclusion procedure based on PSSCH half-duplex transmissions, according to some embodiments.

FIG. 12C is an illustration of some embodiments of a resource exclusion procedure based on PSFCH half-duplex transmissions, according to some embodiments.

FIGS. 19-21 are flow diagrams of some embodiments of a process for determining a second sensing result at a second user equipment (UE), according to some embodiments.

DETAILED DESCRIPTION

Figure 1:
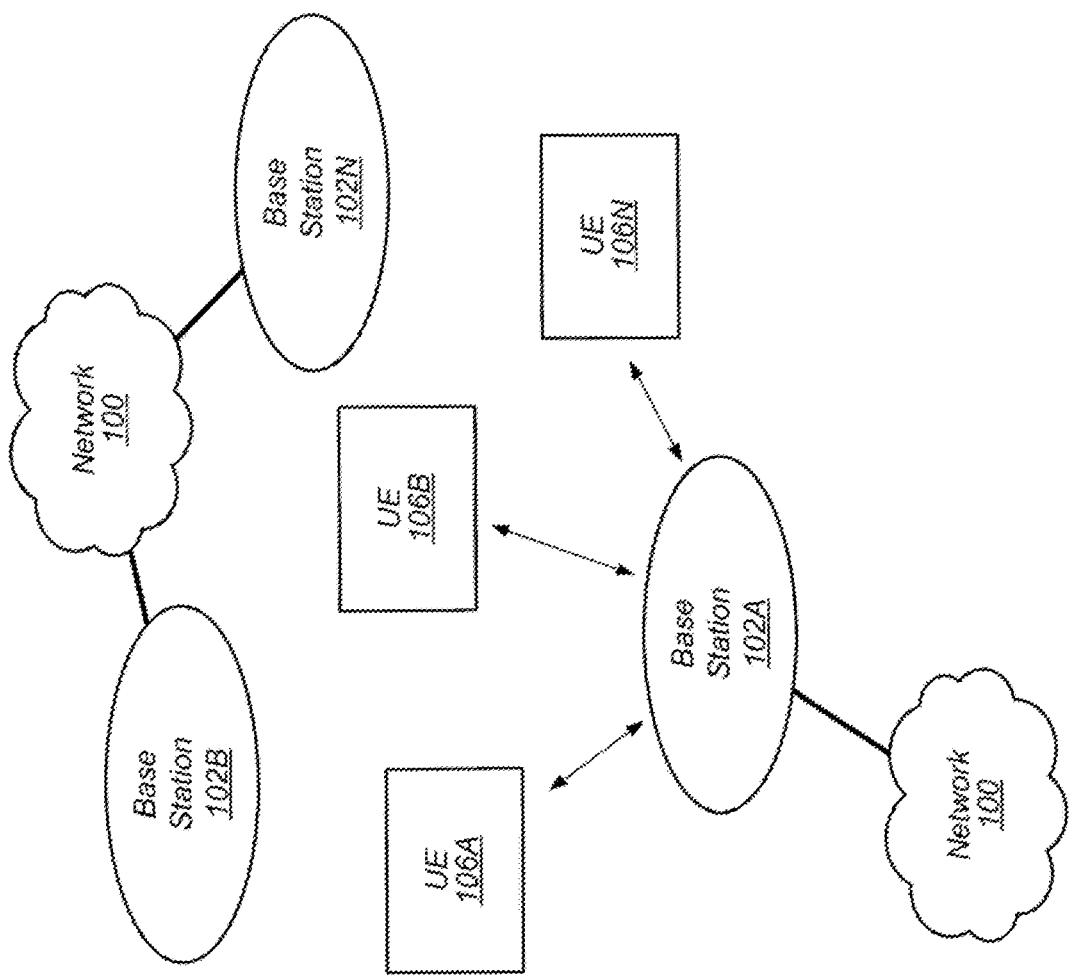
FIG. 1 illustrates an example wireless communication system according to some embodiments.

A method and apparatus of a device that determines and selects a sidelink resource between user equipment for use in sidelink communication is described. The embodiments of method and apparatus of device determines a set of sidelink resources at a first UE. A first sensing result including information gathered as a result of a local sensing at the first UE is transmitted to a second UE in Mode 2. Thereafter, the second UE considers the first sensing result and the information in a sidelink resource selection for its data transmission. When implemented, the embodiments of method and apparatus of a device provide enhancement in Mode 2 for enhanced reliability and reduced latency in consideration of both Packet Reception Ratio (PRR) and Packet Inter-Reception (PIR) defined in TR37.885. The embodiments of method and apparatus of a device described herein are operable with in-coverage UE, partial coverage UE, and out-of-coverage UE, as well as address consecutive packet loss in all coverage scenarios.

In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "some embodiments" or "an embodiment" means that a particular feature, structure, or characteristic described in connection with the embodiment can be included in at least one embodiment of the invention. The appearances of the phrase "in some embodiments" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that determines a resource at a first user equipment (UE) for a sidelink communication from a second UE to the first UE is described. In an exemplary embodiment, the method receives a request from the second UE to send data to the first UE. In addition, the method determines a preconfigured resource selection window that is used by the second UE. Furthermore, the method determines a first sensing result at the first UE. The determined first sensing result includes information to be reported to the second UE for a resource selection. The determined first sensing result has a plurality of first sensing types. Further, the method transmits the first sensing result from the first UE to the second UE.

A method and apparatus of a device that selects a resource at a second user equipment (UE) for a sidelink communication from the second UE to a first UE is described. The method receives a first sensing result from a first UE. The first sensing result includes a plurality of first sensing types. Each of the plurality of first sensing types has a first information for a resource selection at the second UE. In addition, the method determines a second sensing result at the second UE. The determined second sensing result includes a second information and the determined second sensing result has a number of second sensing types. Furthermore, the method determines a combined sensing result based on the received first result and the determined second result. Additionally, the method selects the resource to transmit data from the second UE to the first UE based on the determined combined sensing result.

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Figure 2:
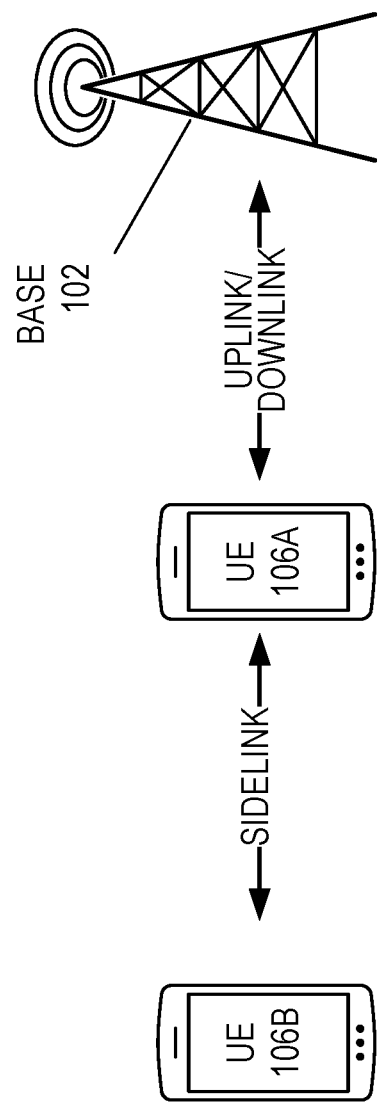
FIG. 2 illustrates a base station (BS) in communication with a user equipment (UE) device according to some embodiments.

FIG. 2 illustrates user equipment 106A and 106B that can be in direct communication with each other (also known as device to device or sidelink). Sidelink communication can utilize dedicated sidelink channels and sidelink protocols to facilitate communication directly between devices. For example, physical sidelink control channel (PSCCH) can be used for actual data transmission between the devices, physical sidelink shared channel (PSSCH) can be used for conveying sidelink control information (SCI), physical sidelink feedback channel (PSFCH) can be used for HARQ feedback information, and physical sidelink broadcast channel (PSBCH) can be used for synchronization. Additional details are discussed in other sections.

In addition, sidelink communications can be used for communications between vehicles to vehicles (V2V), vehicle to infrastructure (V2I), vehicle to people (V2P), vehicle to network (V2N), and other types of direct communications.

UE 106A can also be in communication with a base station 102 in through uplink and downlink communications, according to some embodiments. The UEs may each be a device with cellular communication capability such as a mobile phone, a hand-held device, a computer or a tablet, or virtually any type of wireless device. The UEs 106A-B may include a processor that is configured to execute program instructions stored in memory. The UEs 106A-B may perform any of the method embodiments described herein by executing such stored instructions. Alternatively, or in addition, the UEs 106A-B may include a programmable hardware element such as an FPGA (field-programmable gate array) that is configured to perform any of the method embodiments described herein, or any portion of any of the method embodiments described herein.

The UEs 106A-B may include one or more antennas for communicating using one or more wireless communication protocols or technologies. In some embodiments, the UEs 106A-B may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UEs 106A-B may share one or more parts of a receive and/or transmit chain between multiple wireless communication technologies, such as those discussed above.

In some embodiments, the UEs 106A-B may include separate transmit and/or receive chains (e.g., including separate antennas and other radio components) for each wireless communication protocol with which it is configured to communicate. As a further possibility, the UEs 106A-B may include one or more radios which are shared between multiple wireless communication protocols, and one or more radios which are used exclusively by a single wireless communication protocol. For example, the UE 106A-B might include a shared radio for communicating using either of LTE or 5G NR (or LTE or 1×RTTor LTE or GSM), and separate radios for communicating using each of Wi-Fi and Bluetooth. Other configurations are also possible.

Figure 3:
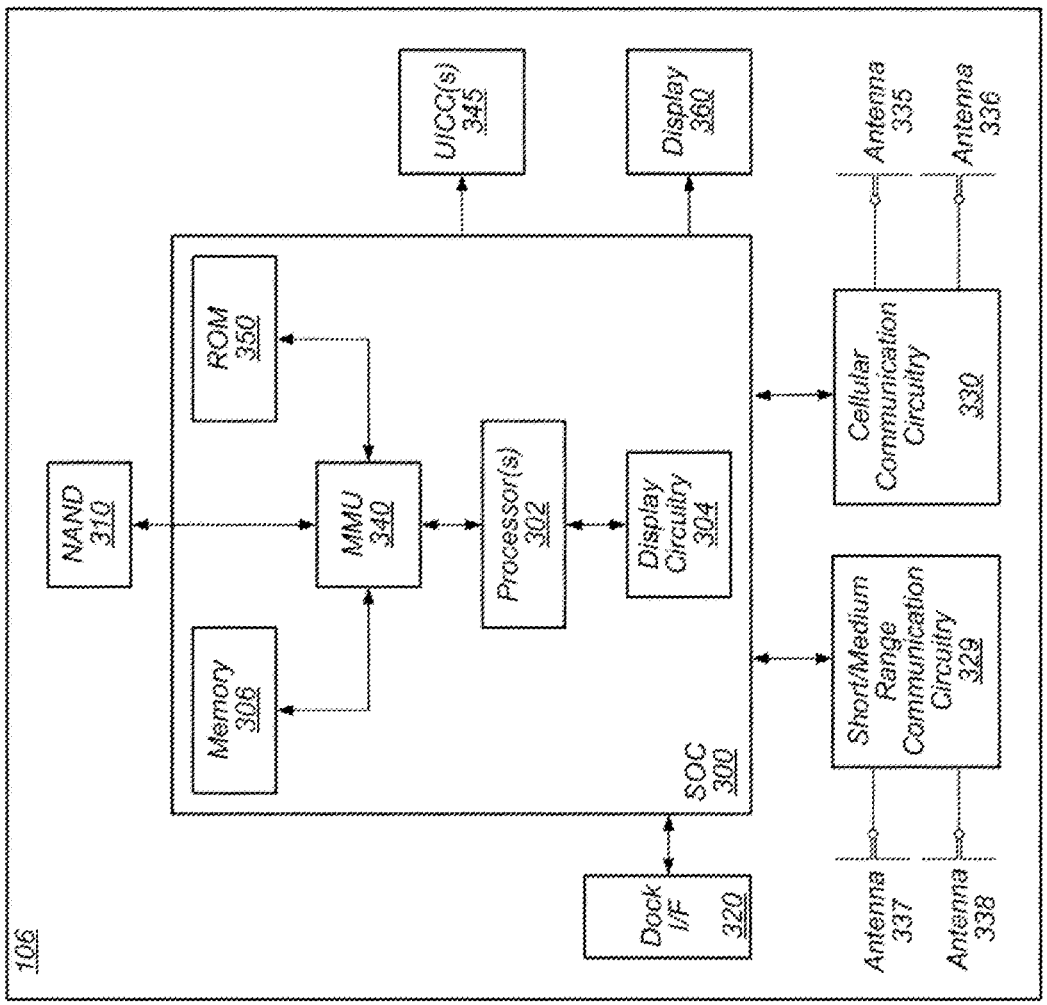
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple radio access technologies (RATs) (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may also be configured to determine a physical downlink shared channel scheduling resource for a user equipment device and a base station. Further, the communication device 106 may be configured to group and select CCs from the wireless link and determine a virtual CC from the group of selected CCs. The wireless device may also be configured to perform a physical downlink resource mapping based on an aggregate resource matching patterns of groups of CCs.

As described herein, the communication device 106 may include hardware and software components for implementing the above features for determining a physical downlink shared channel scheduling resource for a communications device 106 and a base station. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
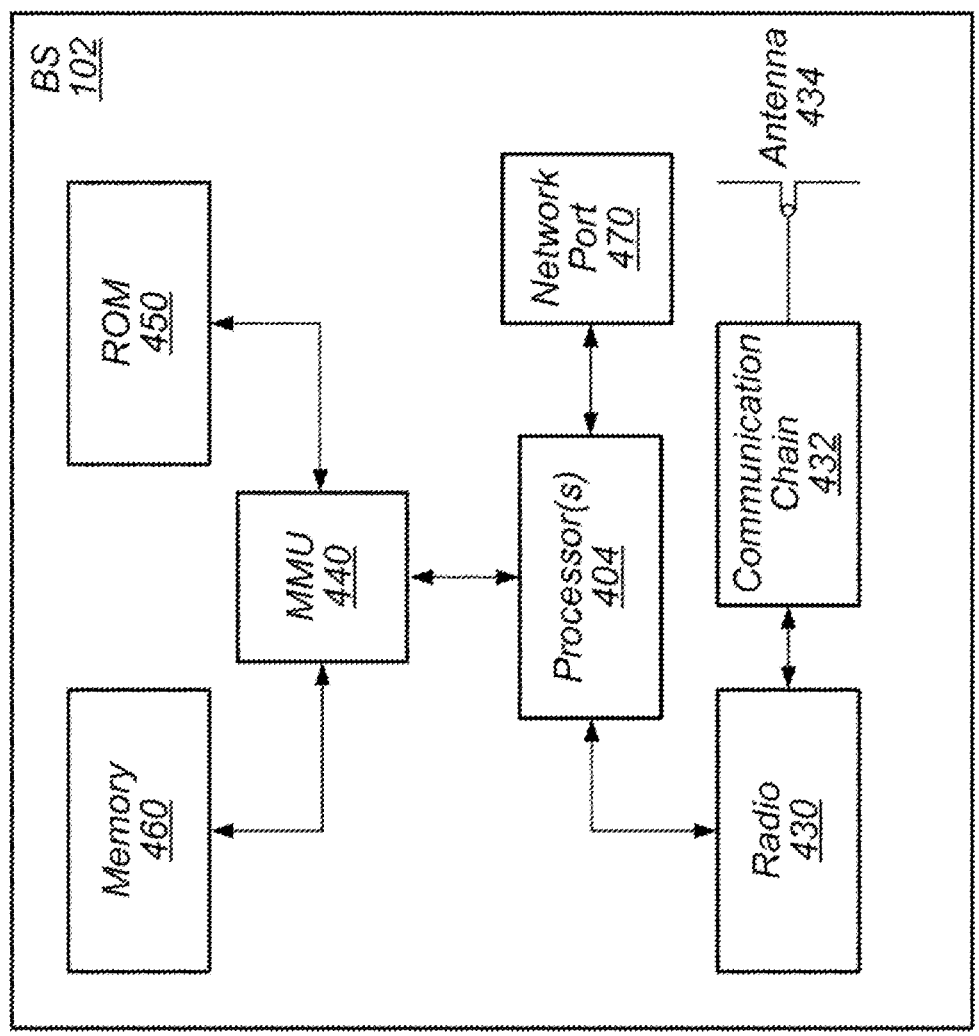
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
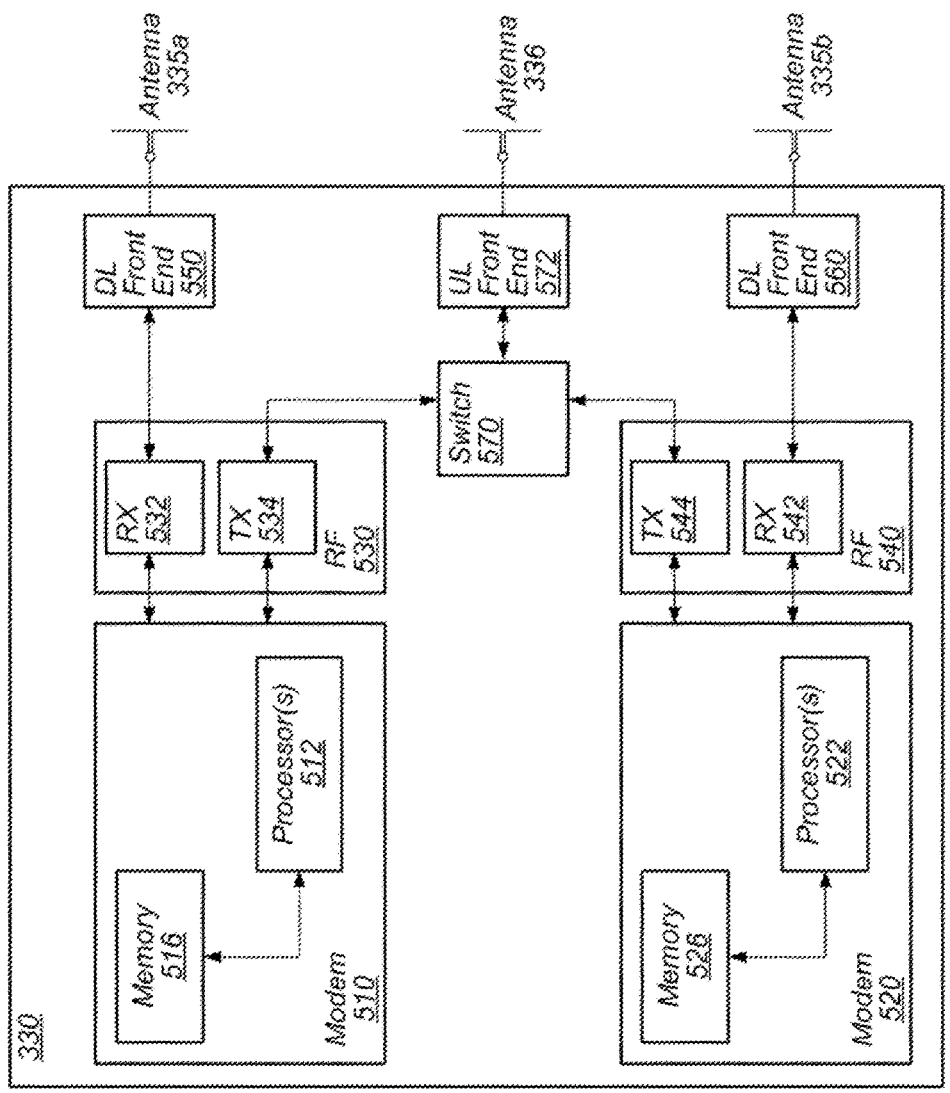
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335 a-b and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

As described herein, the modem 510 may include hardware and software components for implementing the above features or for selecting a periodic resource part for a user equipment device and a base station, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for selecting a periodic resource on a wireless link between a UE and a base station, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Resource Exclusion for Intra-Device Coordination

Figure 6:
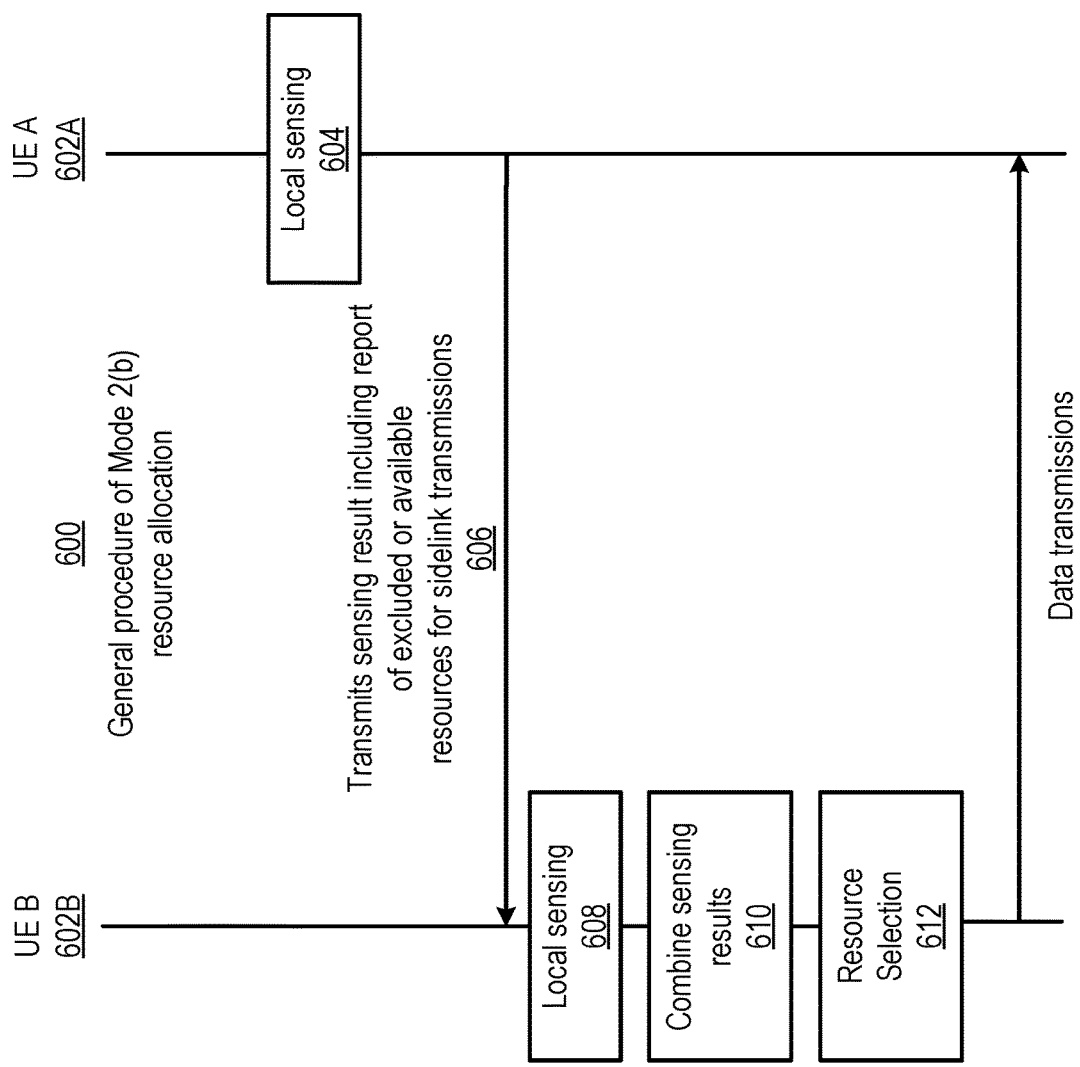
FIG. 6 is an illustration of some embodiments of Mode 2(b) resource allocation procedure, according to some embodiments.

FIG. 6 is an illustration of some embodiments of a procedure 600 of mode 2(b) resource allocation for a sidelink communication. Mode 2(b) focuses on additional assistance information for resource selection. Embodiments of the presented herein describe which assistance information is used and how it is acquired, which UE sends assistance information, how to deliver assistance information, and how assistance information is taken into account in determining sidelink resource for transmission. Sidelink unicast, sidelink groupcast and sidelink broadcast are supported in NR V2X. In sidelink broadcast, receiving UEs are around the transmitting UE in all directions with various distances. Hence, the assistance information collected from one UE may not fit for all receiving UEs. Furthermore, the sidelink feedback may not be supported for broadcast. Hence, the inter-UE coordination may be suitable for sidelink unicast or groupcast. In FIG. 6, a first UE 602A (e.g., UE A) can be configured as a receiving UE and can perform a local sensing. The local sensing is a part of a resource selection mechanism and is performed to understand the receiving UE's behavior and gather information to be reported to the transmitting UE. In the resource sensing phase, a UE can attempt to discover potential resource candidates to be utilized for sidelink transmission. In some embodiments, the potential resource candidates can include unoccupied resources and occupied resources utilized by ongoing sidelink transmission or reception. After completing the local sensing phase 604, the first UE 602A can transmit the sensing result 606 to a second 602B (e.g., UE B). In some embodiments, the second UE 602B can be configured as a transmitting UE.

The sensing result 606 can include information relating to the excluded or available resources for sidelink transmissions. In some embodiments, the second UE 602B can also perform a local sensing 608. The local sensing at the second UE is performed to understand the second UE's behavior and how to handle the reported information from the first UE. After receiving the sensing result 606 from the first UE 602A and completing the local sensing 608, the second UE 602B can combine 610 the result received from the first UE 602A and the result obtained during its own local sensing. Thereafter, the second UE can perform a resource selection 612 to select sidelink resources based on the combined sensing results. After the resource selection 612, the second UE 602B can transmit the data to the first UE 602A on the sidelink resource based on the selected sidelink resource.

Figure 7:
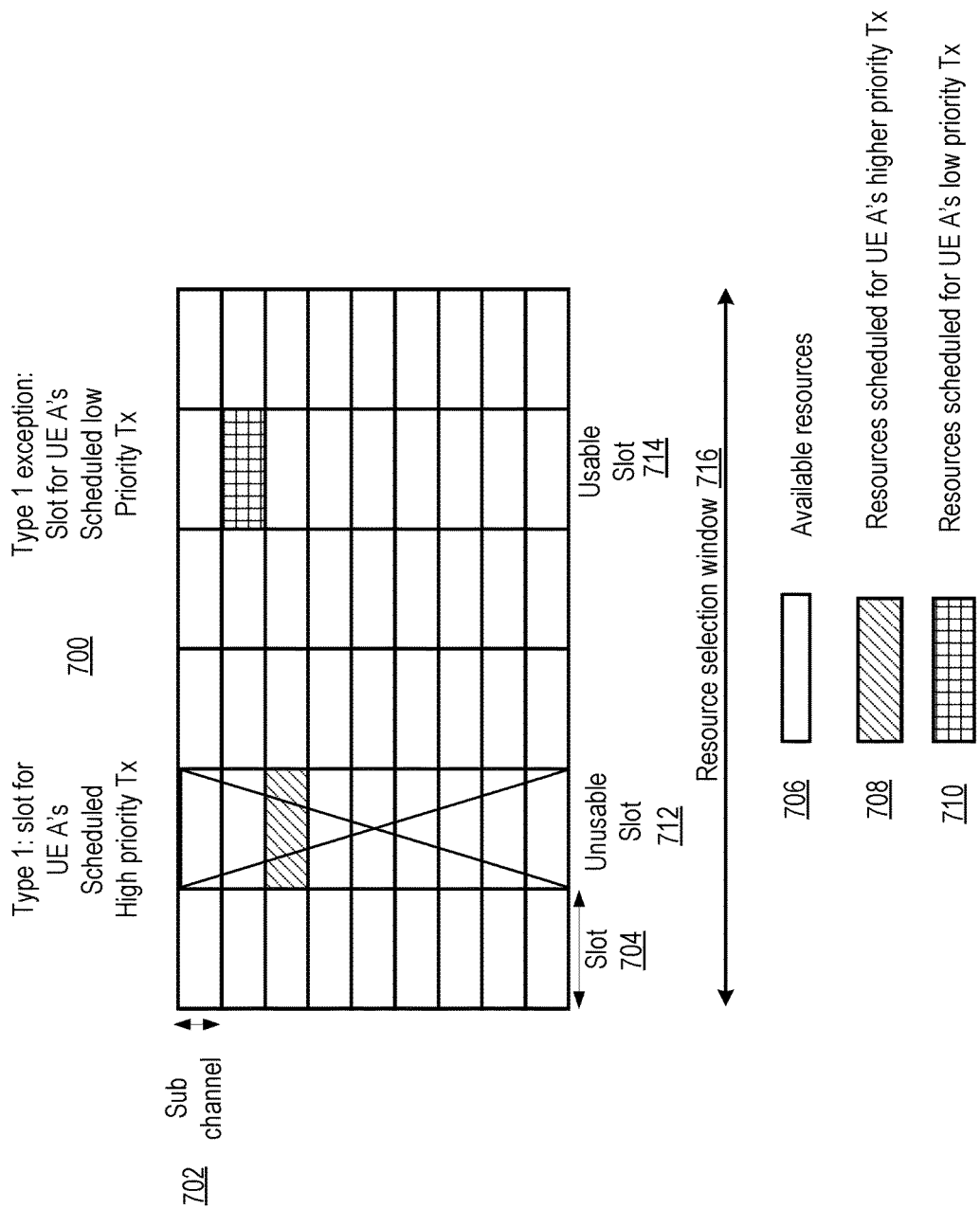
FIG. 7 is an illustration of some embodiments of a resource exclusion procedure based on PSSCH half-duplex transmission, according to some embodiments.

FIG. 7 is an illustration of some embodiments of sidelink resource exclusion procedure based on Physical Sidelink Control Channel (PSSCH) half-duplex transmission. In FIG. 7, in some embodiments, a preselected resource selection window (n+T1', n+T2') 716 within which a resource selection can be performed is determined. In some other embodiments, a preselected resource selection window can determine the duration which the sensing result or the sensing/assistant information can be transmitted. The resource selection window (i.e., T1', T2') can be preselected. In some embodiments, T1' can bounded by the UE processing time limitation in which the UE processes the sensing results and prepares for the sidelink transmission. T2' can depend on the data delay budget. If T2' is too large, the data required for the transmission time will be expired.

In FIG. 7, the horizontal axis can represent a time domain of a timeline and the vertical axis can represent a frequency domain. In the frequency domain, a resource pool can be divided into sub-channels 702. In the time-domain, a resource pool can be divided into slots (e.g., 704). In NR, slots can be among other components that define resources in the time domain. In some embodiments, when the first UE attempts to determine which resources are unavailable for it to receive from the second UE, the first UE can consider a PSSCH. In the PSSCH, the data information and the control information can be combined into one block.

As depicted further in FIG. 7, all the resources 706 in the resource pool within the resource selection window can be available at the beginning of the resource selection process. In some embodiments, within the resource selection window, the first UE (e.g., UE A) can determine a set of candidate resources that can be received from the second UE (e.g., UE B). The set of candidate resources can be determined based on a first sensing result that includes information to be reported to the second UE for a resource selection. The determined first sensing result has a plurality of first sensing types. The first type 700 is based on PSSCH half-duplex transmission. In some embodiments, for example, the PSSCH can be transmitted by a sidelink transmitting UE, which can convey sidelink transmission data, and system information blocks (SIBs) for radio resource control (RRC) configuration.

In some embodiments, the second UE may not be expected to transmit to the first UE in a slot when the first UE already has a scheduled transmission. In FIG. 7, block 708 indicates that the first UE has a scheduled transmission. The slot in which block 708 resides can become an unusable slot 712. Thus, the first UE may be unable to receive data from the second UE in block 708. In these embodiments, half-duplex transmission prevents the first UE from receiving sidelink data from the second UE while transmitting a scheduled transmission in the same slot.

Exceptions may exist based on data Quality of Service (QoS) comparison between the data being transmitted by either the first UE or the second UE. In some embodiments, for example, if the data to be sent from the second UE to the first UE have higher priority than the data to be transmitted by the first UE, then the resource can be available to the second UE with a time conflicting with the first UE's transmissions. As illustrated in FIG. 7, when the first UE already has a scheduled data transmission to the second UE, but the data to be sent from the first UE has a lower priority if compared to the data to be sent by the second UE, then the first UE can allow the second UE to use the resource (e.g., the block 710) to transmit the data. As a result, the slot 714 indicated by block 710 can become usable and can be available to the second UE for the data transmission. In some embodiments, the time (e.g., slot) and/or frequency (e.g., sub-channel) resources for the first UE's transmission and the data priority associated with the first UE's transmission are among the information to be included in the sensing result and to be transmitted to the second UE.

Figure 8:
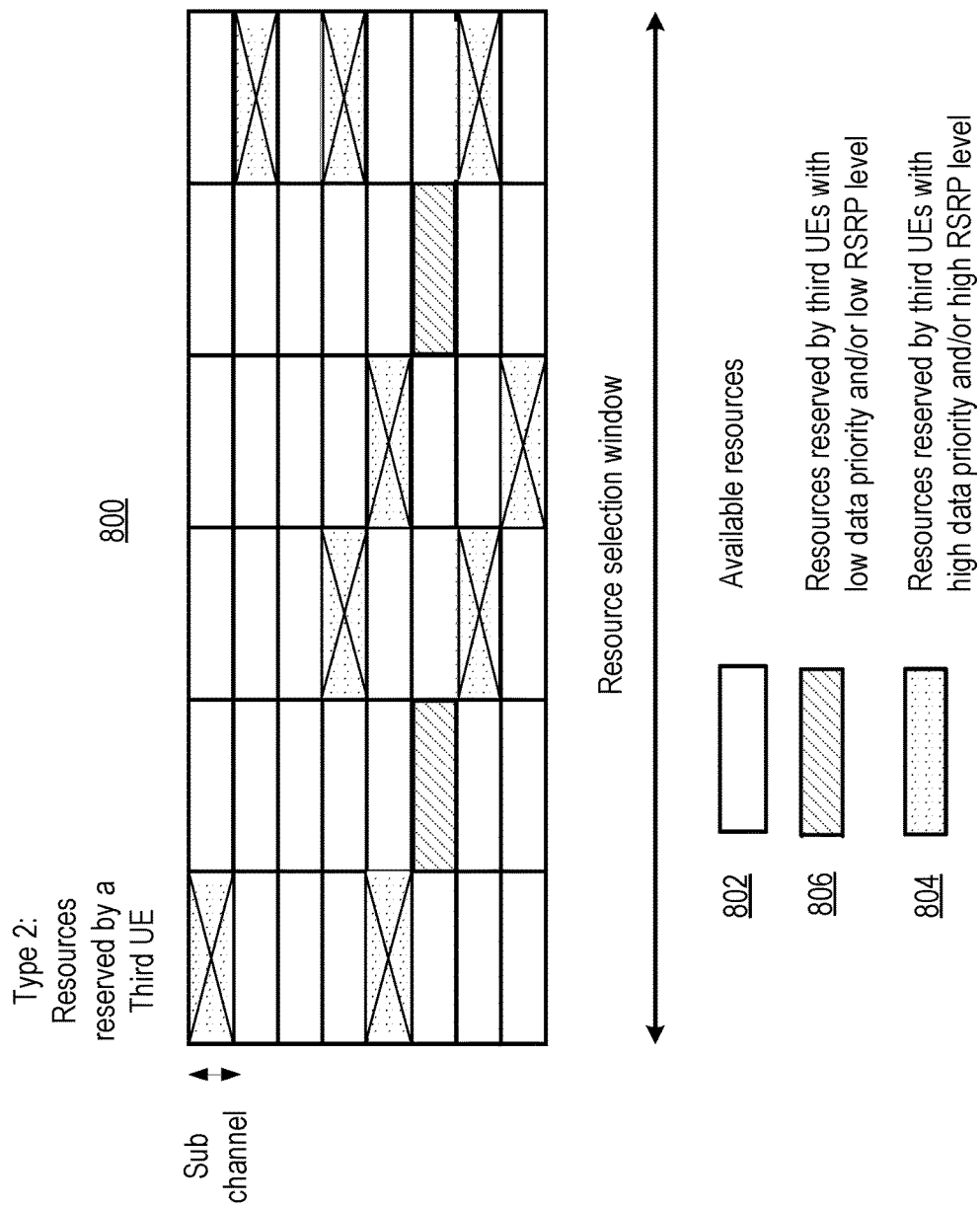
FIG. 8 is an illustration of some embodiments of a resource exclusion procedure based on reservation information from a third UE, according to some embodiments.

FIG. 8 is an illustration of some embodiments of sidelink resource exclusion procedure based on a reservation information obtained from a third UE. In some embodiments, the first UE (e.g., UE A) determines a set of candidate resources that can be received from the second UE (e.g., UE B). The set of candidate resources can be determined based on a first sensing result that includes information to be reported to the second UE for a resource selection. The determined first sensing result has a plurality of first sensing types. The second sensing type 800 is based on a reservation information from a third UE. In some embodiments, the second UE (e.g., 602B) may not use the resource for a transmission if the resource has been reserved by a third UE. In FIG. 8, all the resources 802 in the resource pool can be available at the beginning of the resource selection process. As depicted in FIG. 8, the blocks 804 denote the resources that have been reserved by the third UE with a high data priority. Therefore, these resources that are denoted by blocks 806 may not be available to the second UE for the transmission. The high interference caused by the third UE can prevent the first UE from correctly receiving a transmission from the second UE.

Exceptions may exist based on data QoS comparison. In some embodiments shown in FIG. 8, for example, if the data to be transmitted by the third UE have a low priority and/or the measured Reference Signal Receive Power (RSRP) level is low, then the resource can be available to the second UE for the transmission from the second UE to the first UE. Blocks 806 denote the resources that may be available to the second UE when the data to be transmitted by the third UE have a low priority and/or the measured Reference Signal Receive Power (RSRP) level is low. In some embodiments, if the data priority of a third UE is below a preselected threshold 1, then the resource can be available to second UE. Thus, the second UE can use the resource for the transmission. In some other embodiments, if the measured RSRP level is below a preselected threshold 2, then the resource can be available to second UE. Thus, the second UE can use the available resource for the transmission. In some embodiments, threshold 2 may depend on the data priority of the third UE and/or the data priority of the second UE. In some embodiments, the transmission power of the second UE may be adjusted based on the measured RSRP level to overcome the potential interference. In some embodiments, the time and frequency resources reserved by other UEs, the associated data priority and measured RSRP values, are among the information to be reported to the second UE. This information is included in the sensing result to be transmitted to the second UE.

Figure 9:
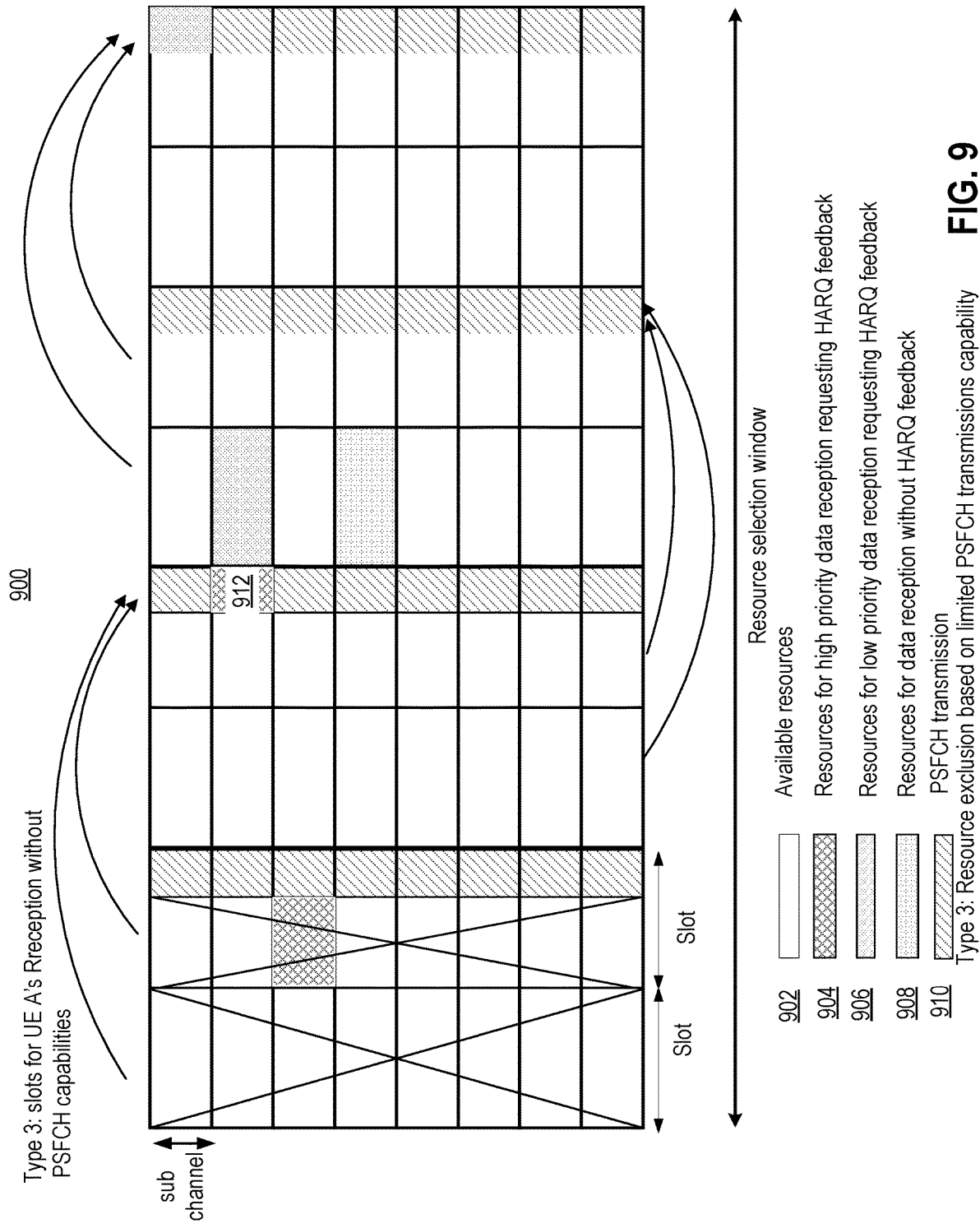
FIG. 9 is an illustration of some embodiments of a resource exclusion procedure based on limited PSFCH transmissions capability, according to some embodiments.

FIG. 9 is an illustration of some embodiments of sidelink resource exclusion procedure based on a limited transmitter capability of Physical Sidelink Feedback Channel (PSFCH) transmissions (for Hybrid automatic repeat request (HARQ) feedback enabled transmissions). In some embodiments, the PSFCH is used by the receiving UE to reply decoding status to a transmitting UE. In some embodiments, the first UE determines a set of candidate resources that can be received from the second UE. The set of candidate resources can be determined based on a first sensing result that includes information to be reported to the second UE for a resource selection. The determined first sensing result has a plurality of first sensing types. The third sensing type 900 is based on the limited transmitter capability of Physical Sidelink Feedback Channel (PSFCH) transmissions (for Hybrid automatic repeat request (HARQ) feedback enabled transmissions). In these embodiments, for example, the second UE (e.g., 602B) may not be expected to transmit to the first UE in a slot whose associated sidelink HARQ feedback is to be transmitted in a slot when first UE cannot transmit additional PSFCH. In some embodiments, the earliest of the PSFCH transmission may be after 2 or 3 slots from the Physical Sidelink Control Channel (PSSCH) transmission according to a pre-configured per resource pool. In some embodiments, the first UE can support at most N simultaneous PSFCH transmissions and this can define a limit of the simultaneous PSFCH transmissions that first UE can support. If the first UE already has N scheduled PSFCH transmissions in a selected slot, then the first UE may not receive any PSSCH transmissions whose associated PSFCH transmissions are in the selected slot.

In FIG. 9, all the resources 902 in the resource pool may be available at the beginning of the resource selection process. As illustrated in FIG. 9 in some embodiments, for example, the first UE can only send 1 PSFCH at a time. Therefore, the first UE can support at most 1 simultaneous PSFCH transmission in the PSFCH transmission slots 902. The first UE may be expected to receive a PSSCH in slot n (e.g., 904 block) whose associated PSFCH transmission occurs in slot (n+K) (e.g., 912). In these embodiments, K may be equal to 2. As depicted in FIG. 9, the PSFCH transmission 910 can occur after 2 slots from the PSSCH transmission denoted by the 904 block. In some other embodiments, the PSFCH transmission can occur after 3 slots from the PSSCH transmission. Then the first UE may not be expected to receive any additional PSSCH in slot n associated with 904 block or around slot n whose associated PSFCH is in slot (n+K) 912. In some embodiments, the resource may be available (e.g., 908) to the second UE if the first UE is expected to receive PSSCH in slot n which does not require PSFCH.

Exceptions may exist based on data QoS comparison. In some embodiments, for example, the first UE can only send 1 a PSFCH at a time. The first UE may be expected to receive the PSSCH in slot n whose associated PSFCH is in slot (n+K). If the scheduled PSSCH has a low priority data as denoted by the 906 block in FIG. 9, then the first UE may be expected to receive a subsequent PSSCH with high priority data in slot n or around slot n whose associated PSFCH is in slot (n+K). In these embodiments, the time-frequency resources of the first UE's expected reception, the data priority associated with the first UE's expected reception, and the number of simultaneous PSFCH transmissions, are transmitted to the second UE.

Figure 10:
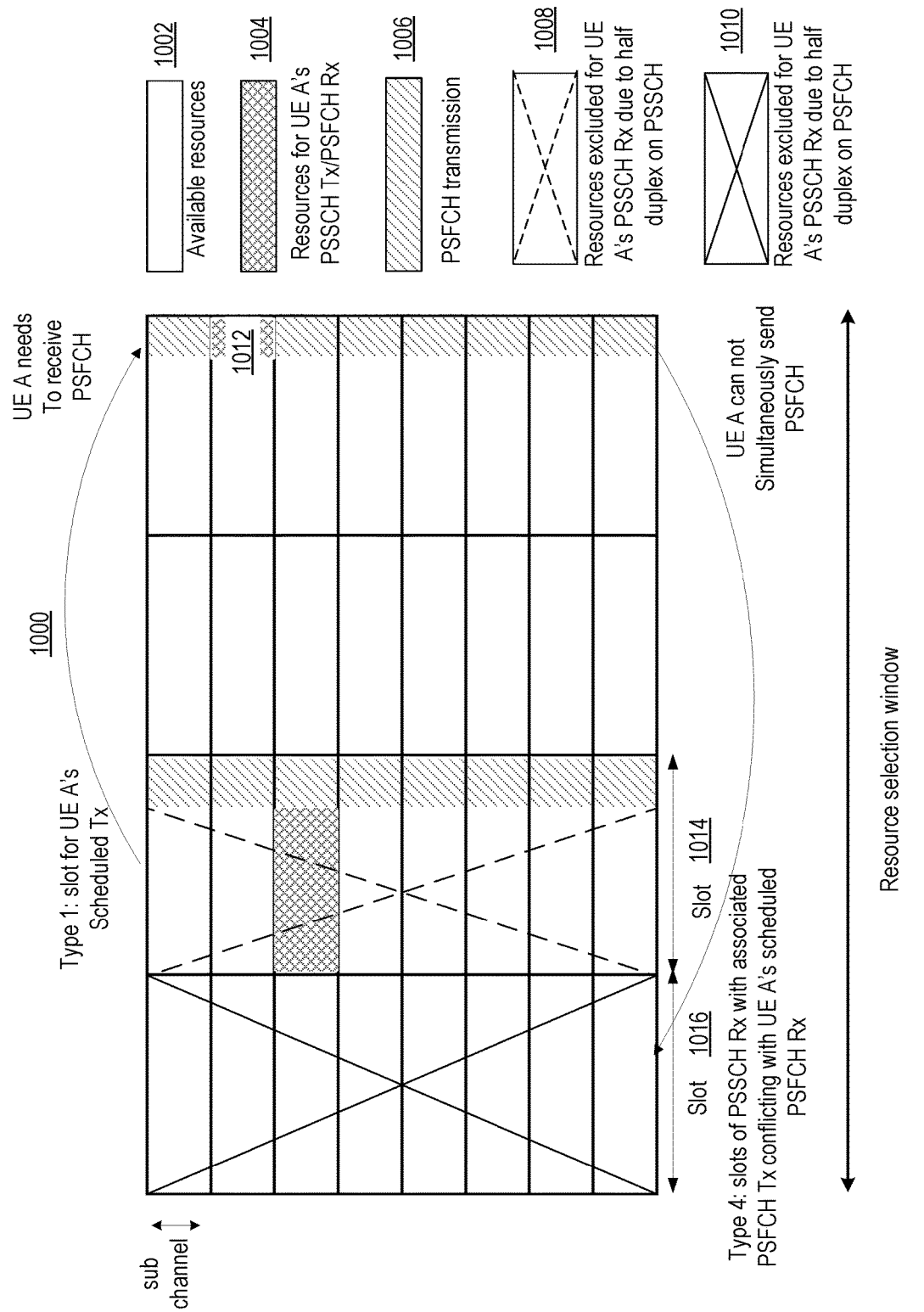
FIG. 10 is an illustration of some embodiments of a resource exclusion procedure based on PSFCH half-duplex transmissions, according to some embodiments.

FIG. 10 is an illustration of some embodiments of sidelink resource exclusion procedure based on a PSFCH half-duplex transmission. In some embodiments, first UE determines a set of candidate resources that can be received from the second UE. The set of candidate resources can be determined based on a first sensing result that includes information to be reported to the second UE for a resource selection. The determined first sensing result has a plurality of first sensing types. The fourth sensing type 1000 is based on PSFCH half-duplex transmission. In these embodiments, the second UE may not be expected to transmit to the first UE in a slot whose associated sidelink HARQ feedback is to be transmitted by first UE in a slot when first UE needs to receive PSFCH. In some embodiments depicted in FIG. 10, for example, the first UE has a scheduled PSSCH transmission in a slot 1014 (e.g., 2nd slot in FIG. 10). The first UE may not receive a PSSCH transmission according to resource exclusion procedure for the first type as discussed above. The first UE may have an associated slot 1012 (e.g., 4th slot in FIG. 10) for a PSFCH reception. Due to PSFCH half-duplex, the slot 1012 (e.g., 4th slot in FIG. 10) for a PSFCH reception may not be used for PSFCH transmission. In some other embodiments, if PSFCH periodicity is larger than 1 slot, this slot 1012 (e.g., 4th slot in FIG. 10) may be with multiple slots 1016 and 1014 (e.g., $1^{st}$ and $2^{nd}$ slots. respectively in FIG. 10) for PSSCH transmission or reception. All the associated slots 1016 and 1014 (i.e., 1st and 2nd slots, respectively in FIG. 10) may be avoided from a PSSCH reception for the first UE if the PSSCH transmission requires HARQ feedback. Half duplex PSFCH transmissions may be avoided. In these embodiments, the time-frequency resources of first UE's scheduled transmissions, the associated data priority, can be included in the first sensing result to be transmitted to the second UE.

In some embodiments, the first UE can iteratively identify the set of candidate resources until the percentage of identified candidate resources is higher than a preselected threshold B. The preselected threshold B may be higher than the threshold in local sensing phase of resource selection procedure at second UE side. Threshold B may be preselected per resource pool or re-configured by PC5-RRC message.

In some embodiments, the identification of the set of candidate resources by the first UE to determine the set of candidate resources can be received from second UE may be repeated by increasing the RSRP threshold for the second rule of resource exclusion such that the preselected threshold B is reached.

FIG. 11 is an illustration of some embodiments of information to be sent to a transmitting UE (e.g., second UE), according to some embodiments. In FIG. 11, the receiving UE (e.g., the first UE) may transmit sensing result including information 1100 to be reported to the transmitting UE (e.g., the second UE). The information may be related to the excluded or available resources for sidelink transmissions from the transmitting UE to the receiving UE. In some embodiments, the first sensing result has a plurality of first sensing types (e.g., first type, second type, third type, and fourth type). The first sensing result can include information to be transmitted to the second UE. The information associated with the first type can include the resource for the first UE's transmission and the data priority associated with the first UE's transmission. In some other embodiments, the information associated with the second type can include the resource for a third UE's transmission, data priority of a third UE's transmission, and the measured RSRP. In some other embodiments, the information associated with the third type can include the resource for the first UE's reception, data priority of the first UE's reception, and the number of simultaneous PSFCH transmissions. In some other embodiments, the information associated with the fourth type can include the resource for first UE's transmission and the data priority of first UE's transmission.

In some embodiments, the second UE can perform a local sensing to generate a second sensing result. The second UE can identify a set of candidate resources or excluded resources that can be transmitted to first UE. The set of candidate resources can be determined based on a second sensing result for a resource selection at the second UE. The determined second sensing result has a plurality of second sensing types.

In some embodiments, the resource exclusion procedure for the first type of second sensing types is similar to the resource exclusion procedure for the first type of the first sensing types. As depicted in FIG. 12A, all the resources 1202 in the resource pool within the resource selection window can be available at the beginning of the resource selection procedure. In some embodiments, within the resource selection window 1208, the second UE (e.g., UE B) can determine a set of candidate resources that can be received from the first UE (e.g., UE A). In some embodiments, the second UE may not be expected to receive from the first UE in a slot when the second UE already has a scheduled reception (e.g., PSSCH reception). In FIG. 12A, block 1204 indicates that the first UE has a scheduled reception. The slot in which block 1204 resides can become an unusable slot 1210. Thus, the second UE may be unable to receive data from the first UE in block 1210.

Exceptions may exist based on data Quality of Service (QoS) comparison between the data being received by either the first UE or the second UE. As illustrated in FIG. 12A, when the second UE already has a scheduled data reception from the first UE, but the data to be received from the first UE has a lower priority if compared to the data to be received by the second UE, then the second UE can use the resource (e.g., the block 1206) to receive the data. As a result, the slot 1212 indicated by block 1206 can become usable and can be available to the second UE for the data reception. Any time slots for the second UE's sidelink reception (similar to first type of the first sensing types at the first UE).

Figure 12B:
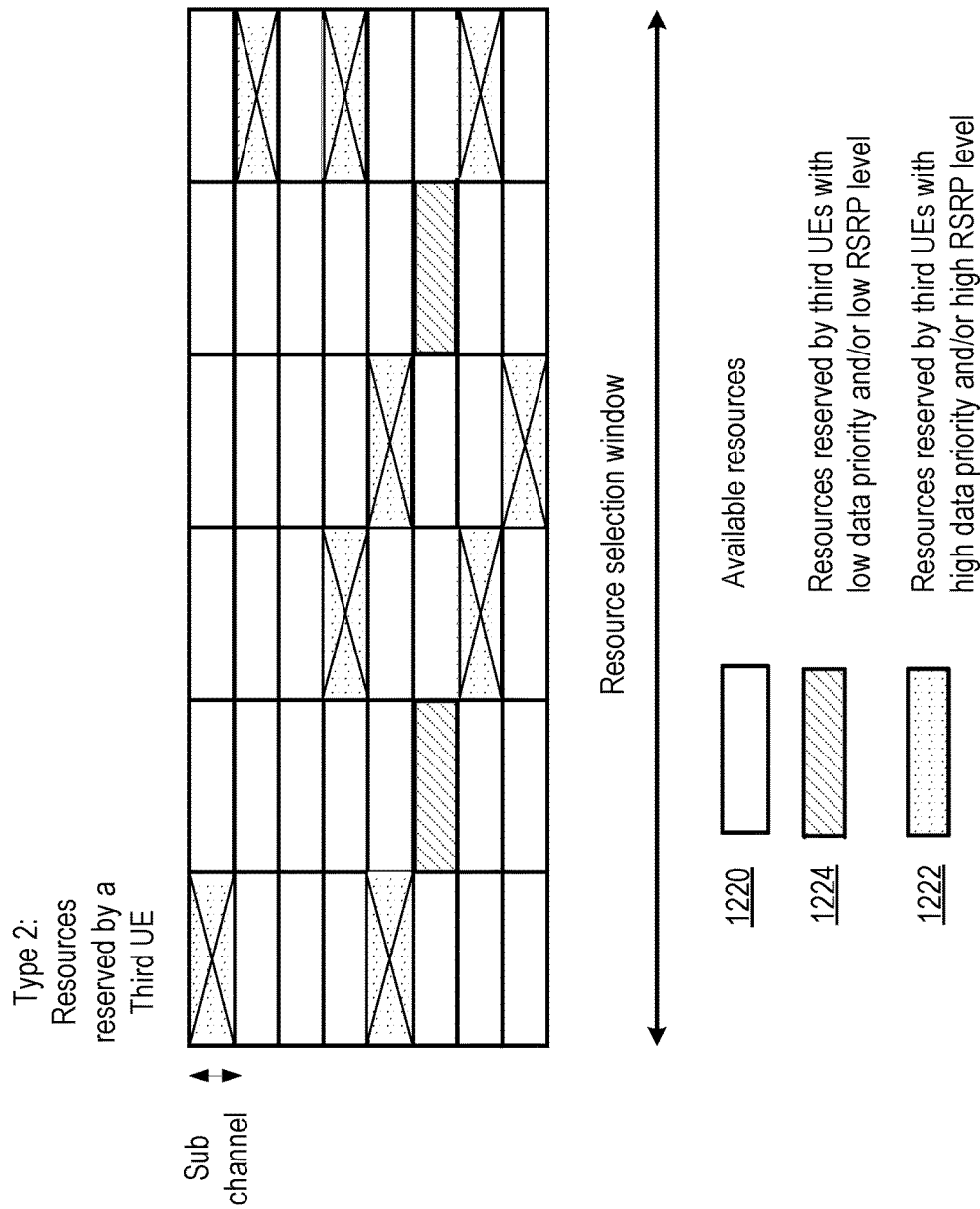
FIG. 12B is an illustration of some embodiments of a resource exclusion procedure based on reservation information from a third UE, according to some embodiments.

In some other embodiments, the resource exclusion procedure for the second type of second sensing types is similar to the resource exclusion procedure for the second type of the first sensing types. FIG. 12B is an illustration of some embodiments of sidelink resource exclusion procedure based on a reservation information obtained from a third UE. The second sensing type is based on a reservation information from a third UE. In some embodiments, the second UE (e.g., 602B) may not use the resource for a transmission if the resource has been reserved by a third UE. In FIG. 12B, all the resources 1220 in the resource pool can be available at the beginning of the resource selection process. As depicted in FIG. 12B, the blocks 1222 denote the resources that have been reserved by the third UE with a high data priority. Therefore, these resources that are denoted by blocks 1222 may not be available to the second UE for the transmission.

Exceptions may exist based on data QoS comparison. In some embodiments shown in FIG. 12B, for example, if the data to be transmitted by the third UE have a low priority and/or the measured Reference Signal Receive Power (RSRP) level is low, then the resource can be available to the second UE for the transmission from the second UE to the first UE. Blocks 1224 denote the resources that may be available to the second UE when the data to be transmitted by the third UE have a low priority and/or the measured Reference Signal Receive Power (RSRP) level is low. In some embodiments, if the data priority of a third UE is below a preselected threshold 1, then the resource can be available to second UE. Thus, the second UE can use the resource for the transmission. In some other embodiments, if the measured RSRP level is below a preselected threshold 2, then the resource can be available to second UE. Thus, the second UE can use the available resource for the transmission. In some embodiments, threshold 2 may depend on the data priority of the third UE and/or the data priority of the second UE. In some embodiments, the transmission power of the second UE may be adjusted based on the measured RSRP level to overcome the potential interference.

In some other embodiments, the third type of the second sensing types is similar to the fourth type of the first sensing types at the first UE's resource exclusion procedure. FIG. 12C is an illustration of some embodiments of resource exclusion procedure based on PSFCH half-duplex transmissions at the second UE, according to some embodiments. In this embodiment, the third type of second sensing types resources exclusion may be based on PSFCH half-duplex transmission. The second UE may need to send a PSFCH for another PSSCH transmission. The second UE may not receive a PSFCH from the first UE in the same slot. Hence, the PSSCH slots associated with the PSFCH reception from first UE may need to be excluded. All the resources 1242 in the resource pool within the resource selection window can be available at the beginning of the resource selection process. In some embodiments depicted in FIG. 12C, for example, the second UE has a scheduled PSSCH reception in a slot 1244 (e.g., 2nd slot in FIG. 12C). The second UE may not receive a PSSCH reception according to resource exclusion procedure for the first type as discussed above. The second UE may have an associated slot 1250 (e.g., 4th slot in FIG. 12C) for a PSFCH transmission. Due to PSFCH half-duplex, the slot 1250 (e.g., 4th slot in FIG. 12C) for a PSFCH transmission 1246 may not be used for PSFCH reception. In some other embodiments, if PSFCH periodicity is larger than 1 slot, this slot 1250 (e.g., 4th slot in FIG. 12C) may be associated with multiple slots 1254 and 1252 (e.g., $1^{st}$ and 2nd slots, respectively in FIG. 12C) for PSSCH transmission or reception. Resource 1248 indicated by slot 1254 (i.e., 1st slots in FIG. 12C) may be avoided from a PSSCH transmission for the second UE if the PSSCH transmission requires HARQ feedback. Half duplex PSFCH transmissions may be avoided.

Referring to FIG. 6, the method for selecting a resource at the second UE for a sidelink communication from the second UE to a first UE the second UE may include combining the results 610 from its local sensing (e.g., second sensing result) and from those (e.g., first sensing result) received from the first UE. The first sensing result may have a plurality of first sensing types (e.g., first, second, third, and fourth). The second sensing result may have a plurality of second sensing types (e.g., first, second, and third). In some embodiments, the method may combine the same type of the excluded resources from the first UE and the second UE. For example, the first type or the second type or the fourth type excluded resources from the first UE may be combined with the first type or the second type or the third type excluded resources from the second UE.

In some other embodiments, the excluded resources from the first UE with some types may not be counted. For example, if the second UE's transmission does not require a PSFCH feedback, then the method can ignore the excluded resources from the third type and the fourth type provided by the first sensing result.

In some other embodiments, the excluded resources from different types may have different priorities. For example, the excluded resources from the first type of the first sensing types may have a higher priority than the excluded resources from the second type of the first sensing types. In another example, the excluded resources from the fourth type may always have higher priority than the excluded resources from the third type since the half duplex issue may be difficult to solve than the simultaneous transmissions of the PSFCH.

In some embodiments, the mechanism that the first UE (e.g., receiving UE A) transmits the information (report) to the second UE (e.g., transmitting UE B) can be extended to a groupcast. The mechanism may only be applied to groupcast HARQ feedback Option 2. In groupcast HARQ feedback Option 1, the transmitting UE may not know the existence of the receiving UE, and hence the transmitting UE is not expected to receive information from the receiving UE.

In some embodiments, groupcast size can be large and the transmission of the report including sensing result can cause some delays. The accuracy of the resource exclusion procedure may be affected if the data service providing the data transmission is not highly reliable.

In some embodiments, a single or a subset of receiving UE can be configured to report the sensing results to the transmitting UE. For example, a group lead for a vehicle platooning can report the sensing results. In some other embodiments, the receiving UE located far from the transmitting UE can report the sensing results by transmitting the information to the transmitting UE.

In some embodiments, reporting of the sensing results may be periodic or event-triggered.

Figure 13:
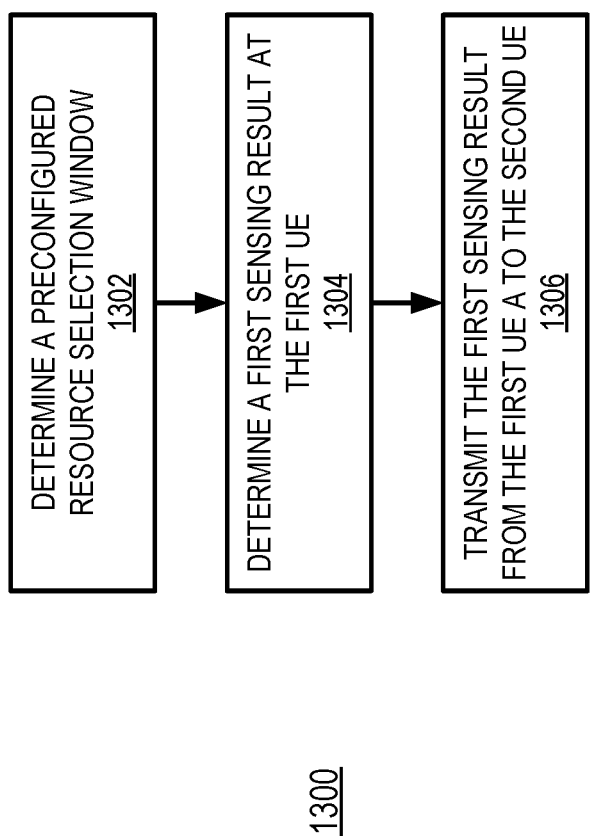
FIG. 13 is a flow diagram of some embodiments of a process to determine resource allocation at a first user equipment (UE) for a wireless communication between the first UE and a second UE, according to some embodiments.

FIG. 13 is a flow diagram of some embodiments of a process 1300 to determine a resource at a first UE for a sidelink communication from the second UE to a first UE. In FIG. 13, in process 1300, the first UE determines a preconfigured resource selection window that is used by the second UE at block 1302. At block 1304, in process 1300, the first UE determines a first sensing result at the first UE. The determined first sensing result can include information to be reported to the second UE for a resource selection and the determined first sensing result may have a plurality of first sensing types. At block 1306, the first UE transmits the first sensing result from the first UE to the second UE.

Figure 14:
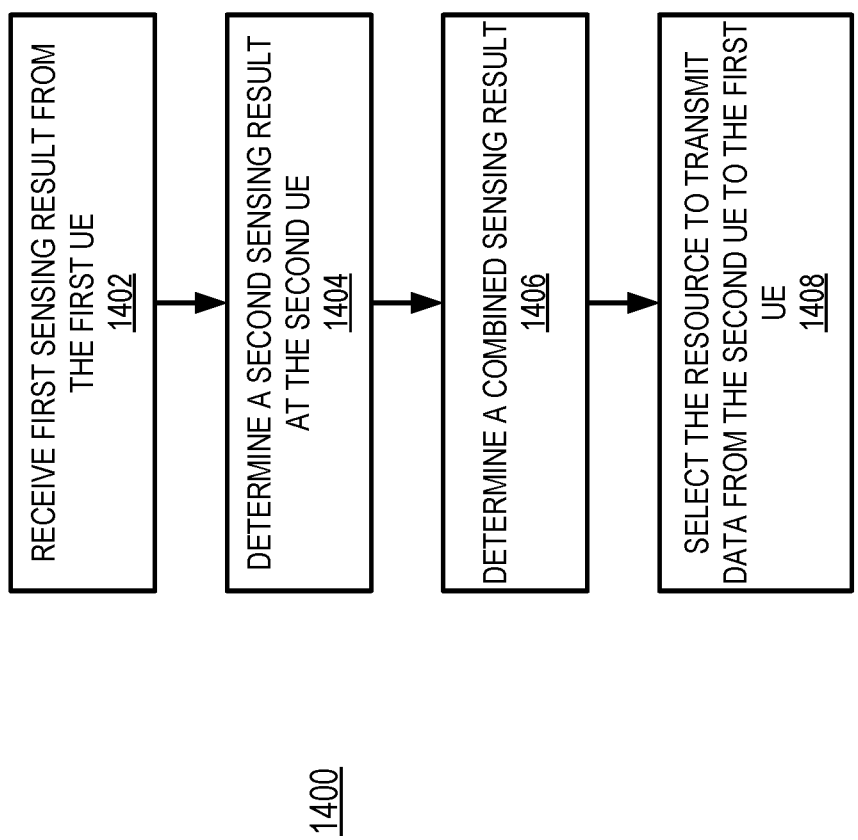
FIG. 14 is a flow diagram of some embodiments of a process for selecting a resource at a second user equipment (UE), according to some embodiments.

FIG. 14 is a flow diagram of some embodiments of a process 1400 for selecting a resource for a sidelink communication from the second UE to a first UE. In FIG. 14, in process 1400, the second UE receives a first sensing result from a first UE at block 1402. The first sensing result includes a plurality of first sensing types. Each of the plurality of first sensing types has a first information for a resource selection at the second UE. At block 1404, in process 1400, the second UE determines a second sensing result at the second UE. The determined second sensing result includes a second information and the determined second sensing result having a plurality of second sensing types. At block 1406, the second UE determines a combined sensing result based on the received first result and the determined second result. At block 1408, the second UE selects the resource to transmit data from the second UE to the first UE based on the determined combined sensing result.

Figure 15:
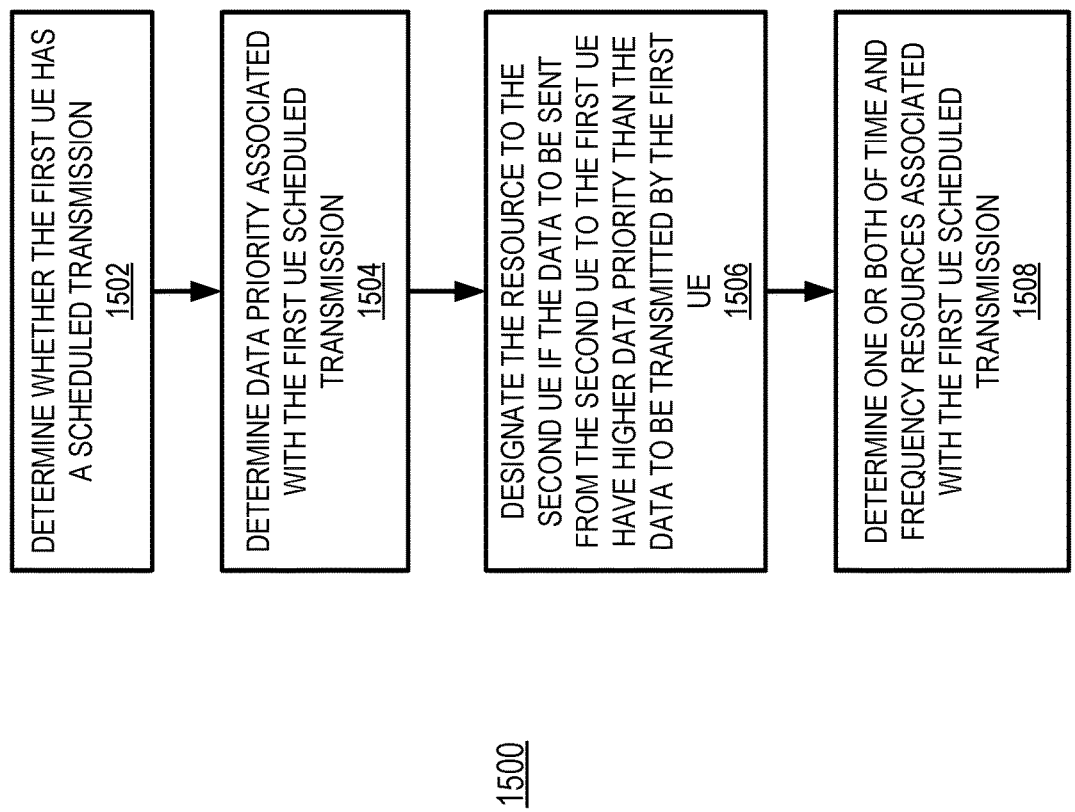
FIGS. 15-18 are flow diagrams of some embodiments of a process for determining a first sensing result at a first user equipment (UE), according to some embodiments.

FIG. 15 is a flow diagram of some embodiments of a process 1500 for determining the first sensing result. In some embodiments, the method determines the first sensing result by the determining whether the first UE has a scheduled transmission at block 1502. In addition, the method determines the first sensing result by determining data priority associated with the first UE scheduled transmission at block 1504. The data priority may be used with the second UE for the resource selection. Furthermore, the method determines the first sensing result by designating the resource to the second UE if the data to be sent from the second UE to the first UE have higher data priority than the data to be transmitted by the first UE at block 1506. At block 1508, in process 1500, the method determines the first sensing result by determining one or both of time and frequency resources associated with the first UE scheduled transmission, wherein the first sensing result defines a first type of the plurality of first sensing types, and wherein the first type of the plurality of first sensing types is based on (Physical Sidelink Shared Channel) PSSCH half-duplex transmission.

Figure 16:
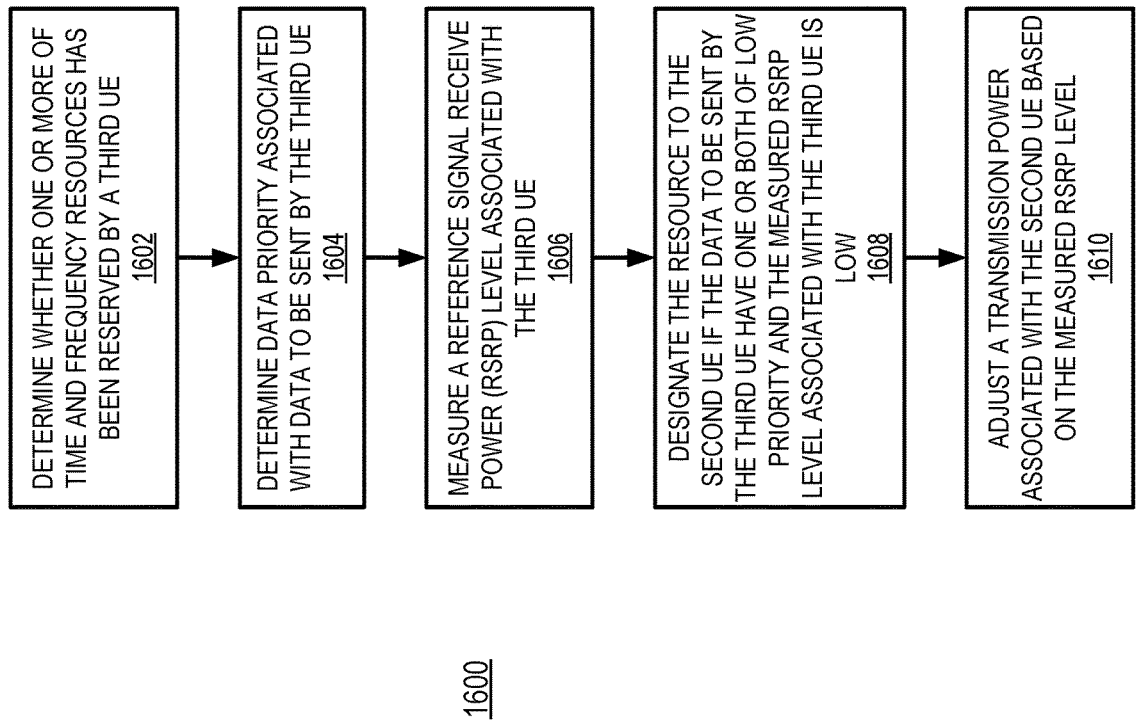

FIG. 16 is a flow diagram of some embodiments of a process 1600 for determining the first sensing result. In some embodiments, the method determines the first sensing result by determining whether one or more of time and frequency resources has been reserved by a third UE at block 1602. In addition, the method determines the first sensing result by determining data priority associated with data to be sent by the third UE at block 1604. Additionally, the method determines the first sensing result by measuring a Reference Signal Receive Power (RSRP) level associated with the third UE at block 1606. Furthermore, at block 1608, the method determines the first sensing result by designating the resource to the second UE if one or both of the data to be sent by the third UE have low priority and the measured RSRP level associated with the third UE is low. The first sensing result defines a second type of the plurality of first sensing types and the second type of the plurality of first sensing types is based on a reservation information from the third UE. Further, the method further determines the first sensing result by adjusting a transmission power associated with the second UE based on the measured RSRP level to overcome an interference generated by the third UE at block 1610.

Figure 17:
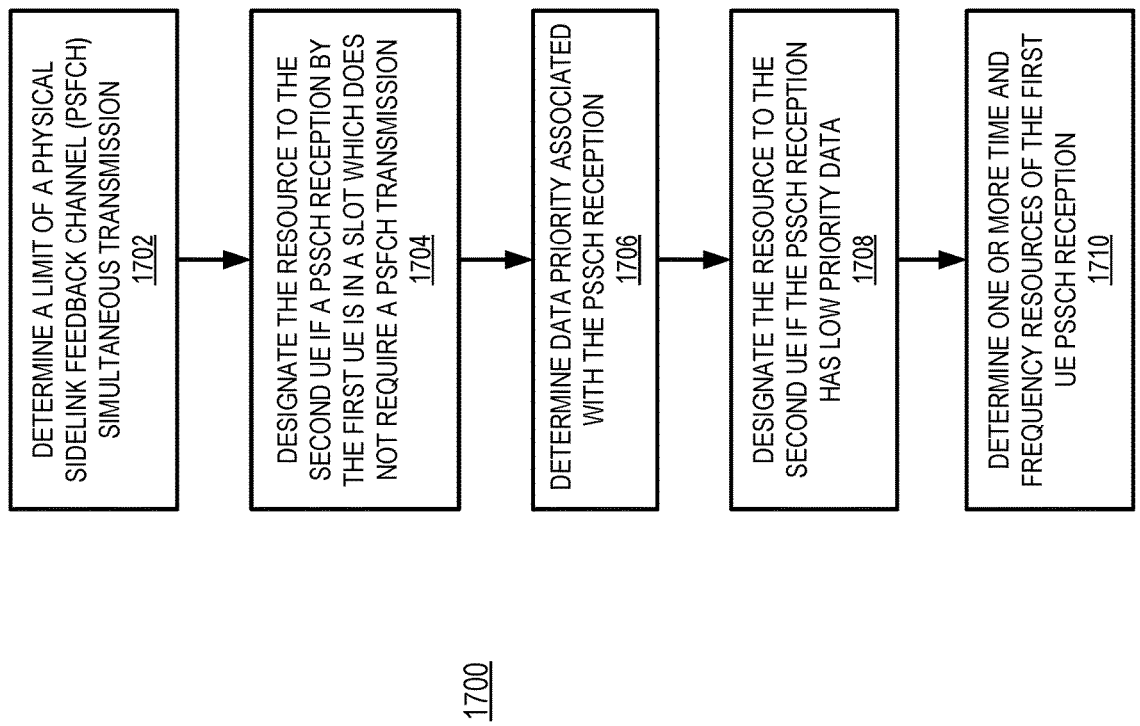

FIG. 17 is a flow diagram of some embodiments of a process 1700 for determining the first sensing result. In some other embodiments, the method determines the first sensing result by determining a limit of a number of simultaneous Physical Sidelink Feedback Channel (PSFCH) transmissions, with a PSFCH associated with a Physical Sidelink Shared Channel (PSSCH) transmission in a slot N at block 1702. The PSFCH is transmitted in a slot N+K, wherein K is predetermined according to a resource pool, and N and K are integers. In addition, the method determines the first sensing result by designating the resource to the second UE if a PSSCH reception by the first UE is in a slot which does not require a PSFCH transmission at block 1704. Moreover, the method determines the first sensing result by determining data priority associated with the PSSCH reception at block 1706. Additionally, at block 1708, the method determines the first sensing result by designating the resource to the second UE if the PSSCH reception has low priority data. The designating of the resource includes receiving an additional PSSCH reception with high priority data in the slot N or around the slot n whose associated PSFCH transmission is in the slot N+K. Furthermore, the method determines the first sensing result by determining one or more time and frequency resources of the first UE PSSCH reception at block 1710. The first sensing result defines a third type of the plurality of first sensing types and the third type of the plurality of first sensing types is based on limited capability of the PSFCH transmission for a Hybrid automatic repeat request (HARQ) feedback enabled transmissions.

Figure 18:
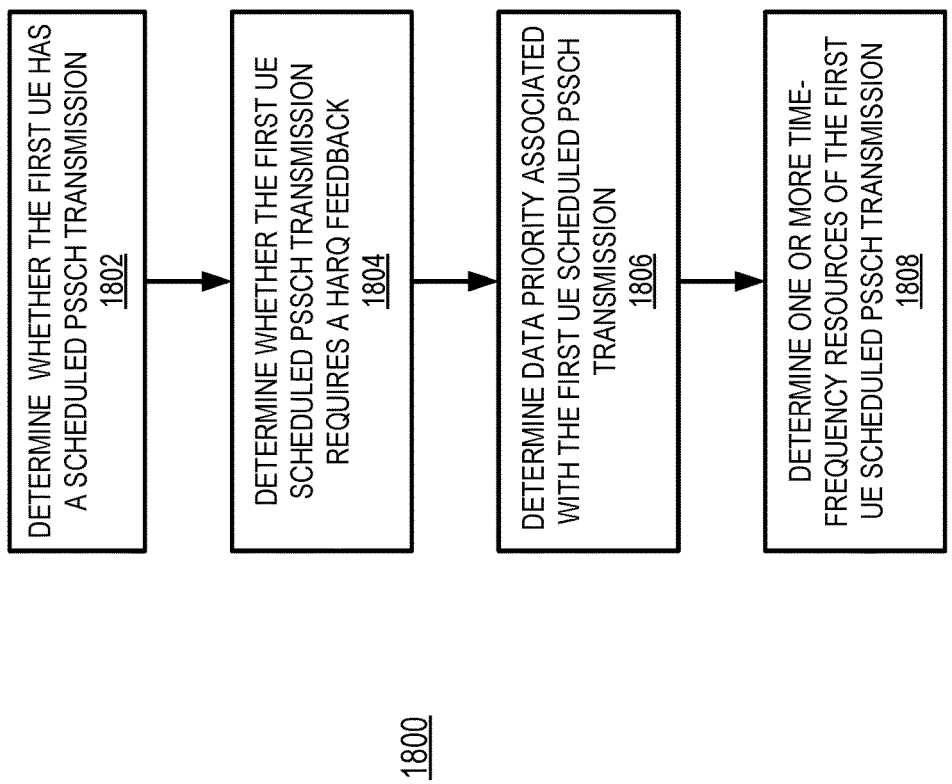

FIG. 18 is a flow diagram of some embodiments of a process 1800 for determining the first sensing result. In some other embodiments, the method determines the first sensing result by determining whether the first UE has a scheduled PSSCH transmission at block 1802. The first UE scheduled PSSCH transmission has an associated slot for a PSFCH reception. In addition, the method determines the first sensing result by determining whether the first UE scheduled PSSCH transmission requires a HARQ feedback at block 1804. Additionally, the method determines the first sensing result by determining data priority associated with the first UE scheduled PSSCH transmission at block 1806. The determining of the data priority includes comparing data to be sent from the second UE to the first UE and data to be transmitted by the first UE. Furthermore, the method determines the first sensing result by determining one or more time-frequency resources of the first UE scheduled PSSCH transmission at block 1808. The first sensing result defines a fourth type of the plurality of first sensing types and the fourth type of the plurality of first sensing types is based on a PSFCH half-duplex transmission.

In some other embodiments, the method iteratively identifies a set of resources of the resource at the first UE until a percentage of the identified set of resources is higher than a predefined threshold. The predefined threshold can be preconfigured or configured based on a resource pool or reconfigured by a PC5-Radio Resource Control (RRC) message.

In some other embodiments, the method determines the first sensing result by repeating a determination of a resource associated with one of the plurality of first sensing types with an increased threshold associated with a RSRP level such that the predefined threshold is achieved. In some embodiments, the one of the plurality of first sensing types can be a second type.

In some other embodiments, the determining of the first sensing result can be adapted to a sidelink group-cast with a Hybrid automatic repeat request (HARQ) feedback Option 2. The first sensing result can be transmitted on a PSSCH. The transmitting the first sensing result can be performed by a single or a subset of UEs. The transmitting the first sensing result can be periodic or event-triggered.

In some embodiments, the transmitting the first sensing result is periodic or event-triggered.

Figure 19:
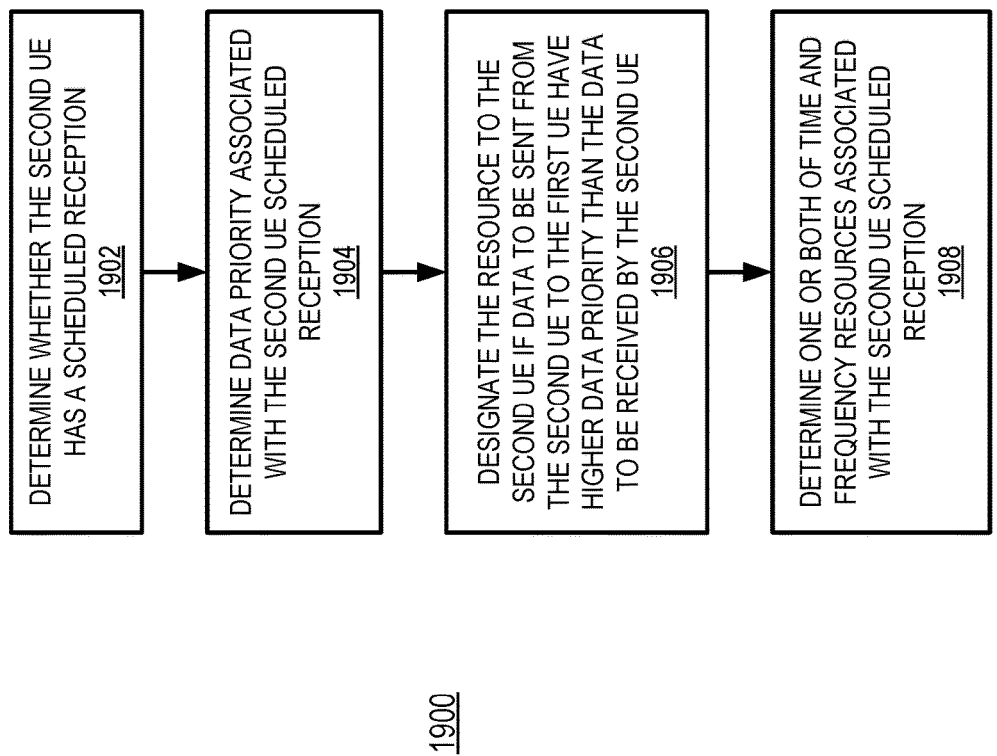

FIG. 19 is a flow diagram of some embodiments of a process 1900 for determining the second sensing result. In some embodiments, the method determines the second sensing result by determining whether the second UE has a scheduled reception at block 1902 (e.g., PSSCH reception). In addition, the method determines the second sensing result by determining data priority associated with the second UE scheduled reception at block 1904. The data priority to be used for the resource selection. The method determines the second sensing result by designating the resource to the second UE if data to be sent from the second UE to the first UE have higher data priority than the data to be received by the second UE at block 1906. Furthermore, at block 1908, the method determines the second sensing result by determining one or both of time and frequency resources associated with the second UE scheduled reception. The second sensing result defines a first type of the plurality of second sensing types.

Figure 20:
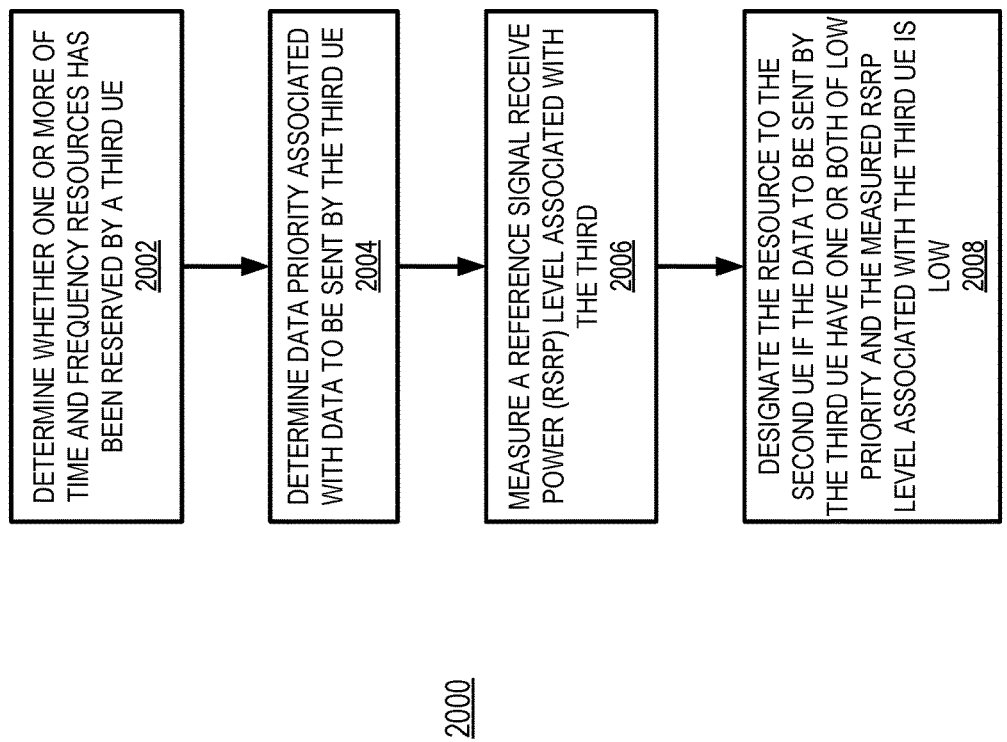

FIG. 20 is a flow diagram of some embodiments of a process 2000 for determining the second sensing result. In some embodiments, the method determines the second sensing result by determining whether one or more of time and frequency resources has been reserved by a third UE at block 2002. In addition, the method determines the second sensing result by determining data priority associated with data to be sent by the third UE at block 2004. Additionally, the method determines the second sensing result by measuring a Reference Signal Receive Power (RSRP) level associated with the third UE at block 2006. Furthermore, at block 2008, the method determines the second sensing result by designating the resource to the second UE if the data to be sent by the third UE have one or both of low priority and the measured RSRP level associated with the third UE is low. The second sensing result defines a second type of the plurality of second sensing types.

FIG. 21 is a flow diagram of some embodiments of a process 2100 for determining the second sensing result. In some other embodiments, the method determines the second sensing result by determining whether the second UE has a scheduled PSSCH reception at block 2102. The second UE scheduled PSSCH reception has an associated slot for a PSFCH transmission. In addition, the method determines the second sensing result by determining whether the second UE scheduled PSSCH reception requires a HARQ feedback at block 2104. Moreover, the method determines the second sensing result by determining data priority associated with the second UE scheduled PSSCH reception at block 2106. The determining includes comparing data to be received by the second UE and data to be transmitted by the second UE. Furthermore, at block 2108, the method determines the second sensing result by determining one or more time-frequency resources of the second UE scheduled PSSCH reception. The second sensing result defines a third type of the plurality of second sensing types and the third type of the plurality of first sensing types is based on PSFCH half-duplex transmission.

In some embodiments, the determining the combined sensing result includes combining the same type of the plurality of first and second sensing types.

In some embodiments, each of the plurality of first and second sensing types has a different priority.

In some embodiments, only a portion of the first information associated with each of the plurality of first sensing types is transmitted to the second UE.

In some embodiments, the first information includes a combination of any of the information associated with any of the plurality of first sensing types.

In some embodiments, the processes or methods depicted in the preceding figures may be performed by a user equipment (UE) device including a processor In some other embodiments, the processes or methods depicted in the preceding figures may be performed by a baseband processor.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract")

instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "selecting," "determining," "receiving," "forming," "grouping," "aggregating," "generating," "removing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A method at a first user equipment (UE) for determining a resource for use by a second UE for sidelink communication to the first UE, the method comprising:
   determining a preconfigured resource selection window that is used by the second UE;
   determining a first sensing result at the first UE by
      determining resources associated with a first UE scheduled transmission,
      determining a data priority associated with the first UE scheduled transmission, the data priority being used by the second UE for resource selection, and
      designating the resource to the second UE if the data to be sent from the second UE to the first UE have higher data priority than the data to be transmitted by the first UE,
   wherein the determined first sensing result includes information to be transmitted to the second UE to identify, by the second UE, an excluded resource in the resource selection window that is excluded for use by the second UE for the sidelink communication to the first UE, and wherein the determined first sensing result has a plurality of first types of sensing; and
   transmitting the first sensing result from the first UE to the second UE.

2. The method of claim 1, wherein the determining the first sensing result comprises:
   determining whether the first UE has a scheduled transmission;
   wherein the first sensing result defines a first type of the plurality of first types of sensing, and wherein the first type of the plurality of first types of sensing is based on a Physical Sidelink Shared Channel (PSSCH) half-duplex transmission.

3. The method of claim 1, wherein the determining the first sensing result comprises:
   determining whether one or more of time and frequency resources has been reserved by a third UE;
   determining data priority associated with data to be sent by the third UE;
   measuring a Reference Signal Receive Power (RSRP) level associated with the third UE; and
   designating the resource to the second UE if one or both of the data to be sent by the third UE have low priority and the measured RSRP level associated with the third UE is low, wherein the first sensing result defines a second type of the plurality of first types of sensing, and wherein the second type of the plurality of first types of sensing is based on a reservation information from the third UE.

4. The method of claim 1, wherein the determining the first sensing result comprises:
   determining a limit of a number of simultaneous Physical Sidelink Feedback Channel (PSFCH) transmissions, with a PSFCH associated with a Physical Sidelink Shared Channel (PSSCH) transmission in a slot n, wherein the PSFCH is transmitted in a slot n+k, wherein K is predetermined according to a resource pool, and N and K are integers;
   designating the resource to the second UE if a PSSCH reception by the first UE is in a slot which does not require a PSFCH transmission;
   determining data priority associated with the PSSCH reception;
   designating the resource to the second UE if the PSSCH reception has low priority data, the designating the resource including receiving an additional PSSCH reception with high priority data in the slot nor around the slot n whose associated PSFCH transmission is in the slot n+k; and
   determining one or more time and frequency resources of the first UE PSSCH reception, wherein the first sensing result defines a third type of the plurality of first types of sensing, and wherein the third type of the plurality of first types of sensing is based on limited capability of the PSFCH transmission for a Hybrid automatic repeat request (HARQ) feedback enabled transmission.

5. The method of claim 1, wherein the determining the first sensing result comprises:
   determining whether the first UE has a scheduled PSSCH transmission, the first UE scheduled PSSCH transmission having an associated slot for a PSFCH reception;
   determining whether the first UE scheduled PSSCH transmission requires a HARQ feedback;
   determining data priority associated with the first UE scheduled PSSCH transmission, the determining including comparing data to be sent from the second UE to the first UE and data to be transmitted by the first UE; and
   determining one or more time-frequency resources of the first UE scheduled PSSCH transmission, wherein the first sensing result defines a fourth type of the plurality of first types of sensing, and wherein the fourth type of the plurality of first types of sending is based on a PSFCH half-duplex transmission.

6. A baseband processor to perform operations for determining a resource for use by a second UE for sidelink communication to a first UE comprising:
   determining a preconfigured resource selection window that is used by a second user equipment (UE);
   determining a first sensing result at a first UE by
      determining resources associated with a first UE scheduled transmission,
      determining a data priority associated with the first UE scheduled transmission, the data priority being used by the second UE for resource selection, and
      designating the resource to the second UE if the data to be sent from the second UE to the first UE have higher data priority than the data to be transmitted by the first UE,
   wherein the determined first sensing result includes information to be reported to the second UE to identify by the second UE, an excluded resource in the resource selection window to be excluded for use by the second UE for the sidelink communication to the first UE, and wherein the determined first sensing result has a plurality of first types of sensing; and
   transmitting the first sensing result from the first UE to the second UE.

7. The baseband processor of claim 6, wherein the determining the first sensing result comprises:
   determining whether the first UE has a scheduled transmission;
   wherein the first sensing result defines a first type of the plurality of first types of sensing, and wherein the first type of the plurality of first types of sensing is based on Physical Sidelink Shared Channel (PSSCH) half-duplex transmission.

8. The baseband processor of claim 6, wherein the determining the first sensing result comprises:
   determining whether one or more of time and frequency resources has been reserved by a third UE;
   determining data priority associated with data to be sent by the third UE;
   measuring a Reference Signal Receive Power (RSRP) level associated with the third UE; and
   designating the resource to the second UE if one or both of the data to be sent by the third UE have low priority and the measured RSRP level associated with the third UE is low, wherein the first sensing result defines a second type of the plurality of first types of sensing, and wherein the second type of the plurality of first types of sensing is based on a reservation information from the third UE.

9. The baseband processor of claim 8, wherein the determining the first sensing result further comprises adjusting a transmission power associated with the second UE based on the measured RSRP level to overcome an interference generated by the third UE.

10. The baseband processor of claim 6, wherein the determining the first sensing result comprises:
   determining a limit of a number of simultaneous Physical Sidelink Feedback Channel (PSFCH) simultaneous transmissions, with a PSFCH associated with a Physical Sidelink Shared Channel (PSSCH) transmission in a slot N, wherein the PSFCH is transmitted in a slot N+K, wherein K is predetermined according to a resource pool, and N and K are integers;
   designating the resource to the second UE if a PSSCH reception by the first UE is in a slot which does not require a PSFCH transmission;
   determining data priority associated with the PSSCH reception;
   designating the resource to the second UE if the PSSCH reception has low priority data, the designating the resource including receiving an additional PSSCH reception with high priority data in the slot N or around the slot N whose associated PSFCH transmission is in the slot N+K; and determining one or more time and frequency resources of the first UE PSSCH reception, wherein the first sensing result defines a third type of the plurality of first types of sensing, and wherein the third type of the plurality of first types of sensing is based on limited capability of the PSFCH transmission for a Hybrid automatic repeat request (HARQ) feedback enabled transmission.

11. The baseband processor of claim 6, wherein the determining the first sensing result comprises:
   determining whether the first UE has a scheduled PSSCH transmission, the first UE scheduled PSSCH transmission having an associated slot for a PSFCH reception;
   determining whether the first UE scheduled PSSCH transmission requires a HARQ feedback;
   determining data priority associated with the first UE scheduled PSSCH transmission,
   the determining including comparing data to be sent from the second UE to the first UE and data to be transmitted by the first UE; and
   determining one or more time-frequency resources of the first UE scheduled PSSCH transmission, wherein the first sensing result defines a fourth type of the plurality of first types of sensing, and wherein the fourth type of the plurality of first types of sensing is based on a PSFCH half-duplex transmission.

12. The baseband processor of claim 6, wherein the determining the first sensing result further comprises iteratively identifying a set of resources of the resource at the first UE until a percentage of the identified set of resources is higher than a predefined threshold, the predefined threshold being preconfigured or configured based on a resource pool or reconfigured by a PC5—Radio Resource Control (RRC) message.

13. The baseband processor of claim 12, wherein the determining the first sensing result further comprises repeating a determination of a resource associated with one of the plurality of first types of sensing with an increased threshold associated with a RSRP level such that the predefined threshold is achieved.

14. The baseband processor of claim 13, wherein the one of the plurality of first types of sensing is a second type.

15. The baseband processor of claim 6, wherein the determining the first sensing result is adapted to a sidelink group-cast with a Hybrid automatic repeat request (HARQ) feedback Option 2.

16. The baseband processor of claim 6, wherein the first sensing result is transmitted on a PSSCH.

17. The baseband processor of claim 6, wherein the transmitting the first sensing result is performed by a single or a subset of UEs.

18. The baseband processor of claim 6, wherein the transmitting the first sensing result is periodic or event-triggered.

19. A baseband processor to perform operations for determining a resource for use by a second user equipment (UE) for sidelink communication to a first UE comprising:
   receiving, by the second UE, a first sensing result from a first (UE, the first sensing result including a plurality of first types of sensing, each of the plurality of first types of sensing having a first information to identify an excluded resource in a resource selection window that is excluded for use by the second UE for the sidelink communication to the first UE;
   determining a second sensing result at the second UE, the determined second sensing result including a second information and the determined second sensing result having a plurality of second types of sensing, wherein the determining the second sensing result comprises
      determining resources associated with a second UE scheduled reception;
   determining a data priority associated with the second UE scheduled reception, the data priority being used for the resource selection, and
      designating the resource to the second UE if data to be sent from the second UE to the first UE have higher data priority than the data to be received by the second UE;
   determining, at the second UE, a combined sensing result based on the received first sensing result and the determined second sensing result; and
   selecting the resource to transmit data from the second UE to the first UE based on the determined combined sensing result.

20. The baseband processor of claim 19, wherein the determining the second sensing result comprises:
   determining whether the second UE has a scheduled reception,
   wherein the determining the resources associated with the second UE scheduled reception comprises determining one or both of time and frequency resources associated with the second UE scheduled reception, wherein the second sensing result defines a first type of the plurality of second types of sensing.

* * * * *